(12) United States Patent
Smith et al.

(10) Patent No.: US 7,675,556 B2
(45) Date of Patent: *Mar. 9, 2010

(54) CAMERAS, OTHER IMAGING DEVICES, AND METHODS HAVING NON-UNIFORM IMAGE REMAPPING USING A SMALL DATA-SET OF DISTORTION VECTORS

(75) Inventors: Craig M. Smith, Spencerport, NY (US); Kenneth A. Parulski, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 306 days.

This patent is subject to a terminal disclaimer.

(21) Appl. No.: 11/851,512

(22) Filed: Sep. 7, 2007

(65) Prior Publication Data

US 2007/0296830 A1 Dec. 27, 2007

Related U.S. Application Data

(63) Continuation of application No. 10/213,909, filed on Aug. 7, 2002, now Pat. No. 7,301,568.

(51) Int. Cl.
*H04N 5/76* (2006.01)
*G06K 9/36* (2006.01)
*G06K 9/32* (2006.01)

(52) U.S. Cl. .................. 348/231.3; 382/284; 382/293

(58) Field of Classification Search ............. 348/231.3, 348/231.6, 333.11, 333.12; 382/293, 295, 382/296, 298, 299, 284
See application file for complete search history.

(56) References Cited

U.S. PATENT DOCUMENTS

| | | | |
|---|---|---|---|
| 4,345,825 A | 8/1982 | Matteson et al. | |
| 4,423,934 A | 1/1984 | Lambeth et al. | |
| 5,113,455 A | 5/1992 | Scott | |
| 5,142,310 A | 8/1992 | Taniguchi et al. | |
| 5,164,831 A | 11/1992 | Kuchta et al. | |
| 5,189,453 A | 2/1993 | Boyd | |
| 5,208,872 A | 5/1993 | Fisher | |
| 5,300,974 A | 4/1994 | Stephenson, III | |
| 5,477,264 A | 12/1995 | Sarbadhikari et al. | |

(Continued)

FOREIGN PATENT DOCUMENTS

EP 0 675 648 A2 10/1995

(Continued)

*Primary Examiner*—Jason Chan
*Assistant Examiner*—Nicholas G Giles
(74) *Attorney, Agent, or Firm*—Roland R. Schindler, II; Peyton C. Watkins

(57) ABSTRACT

A camera has a body and an electronic capture unit mounted in the body. The electronic capture unit selectively captures and stores a scene image as a representational electronic image having a first array of pixels. A control system is mounted in the body. The control system provides a remapped electronic image having a second array of pixels. A memory unit is disposed in the body. The memory unit stores a data-set defining an non-uniform mapping between a plurality of primary input coordinates mappable on said first array of pixels and plurality of primary output coordinates mappable on said second array of pixels. The control system uses the data-set to remap the pixels of the input electronic image to provide the remapped electronic image.

20 Claims, 20 Drawing Sheets

U.S. PATENT DOCUMENTS

| | | | |
|---|---|---|---|
| 5,504,583 A | 4/1996 | Jamzadeh et al. | |
| 5,587,752 A | 12/1996 | Petruchik | |
| 5,606,365 A | 2/1997 | Maurinus et al. | |
| 5,619,737 A | 4/1997 | Horning et al. | |
| 5,619,738 A | 4/1997 | Petruchik et al. | |
| 5,640,201 A | 6/1997 | Inuiya | |
| 5,701,529 A | 12/1997 | Yokonuma et al. | |
| 5,701,530 A | 12/1997 | Fujino | |
| 5,726,737 A | 3/1998 | Fredlund et al. | |
| 5,734,425 A | 3/1998 | Takizawa et al. | |
| 5,739,922 A | 4/1998 | Matama | |
| 5,742,855 A | 4/1998 | Saito | |
| 5,748,326 A | 5/1998 | Thompson-Bell et al. | |
| 5,758,216 A | 5/1998 | Arnold | |
| 5,761,558 A | 6/1998 | Patton et al. | |
| 5,828,406 A | 10/1998 | Parulski et al. | |
| 5,913,088 A | 6/1999 | Moghadam et al. | |
| 5,914,748 A | 6/1999 | Parulski et al. | |
| 5,966,297 A | 10/1999 | Minegishi | |
| 5,991,465 A | 11/1999 | Anderson et al. | |
| 6,070,013 A | 5/2000 | Cosgrove et al. | |
| 6,072,962 A | 6/2000 | Parulski | |
| 6,097,901 A | 8/2000 | Parulski | |
| 6,400,908 B1 | 6/2002 | Parulski | |
| 6,546,187 B1 | 4/2003 | Miyazaki et al. | |
| 6,614,938 B2 | 9/2003 | Yamaguchi et al. | |
| 6,650,336 B2 | 11/2003 | Parulski et al. | |
| 7,301,568 B2 * | 11/2007 | Smith et al. | 348/231.3 |
| 2002/0063802 A1 | 5/2002 | Gullichsen et al. | |
| 2002/0080280 A1 | 6/2002 | Champion et al. | |
| 2003/0103156 A1 | 6/2003 | Brake et al. | |

FOREIGN PATENT DOCUMENTS

| | | | |
|---|---|---|---|
| EP | 0 821 265 A1 | | 1/1998 |
| GB | 2350251 A | * | 11/2000 |
| JP | 09-179250 | | 7/1997 |
| JP | 10-115874 | | 5/1998 |
| JP | 10-115875 | | 5/1998 |

* cited by examiner

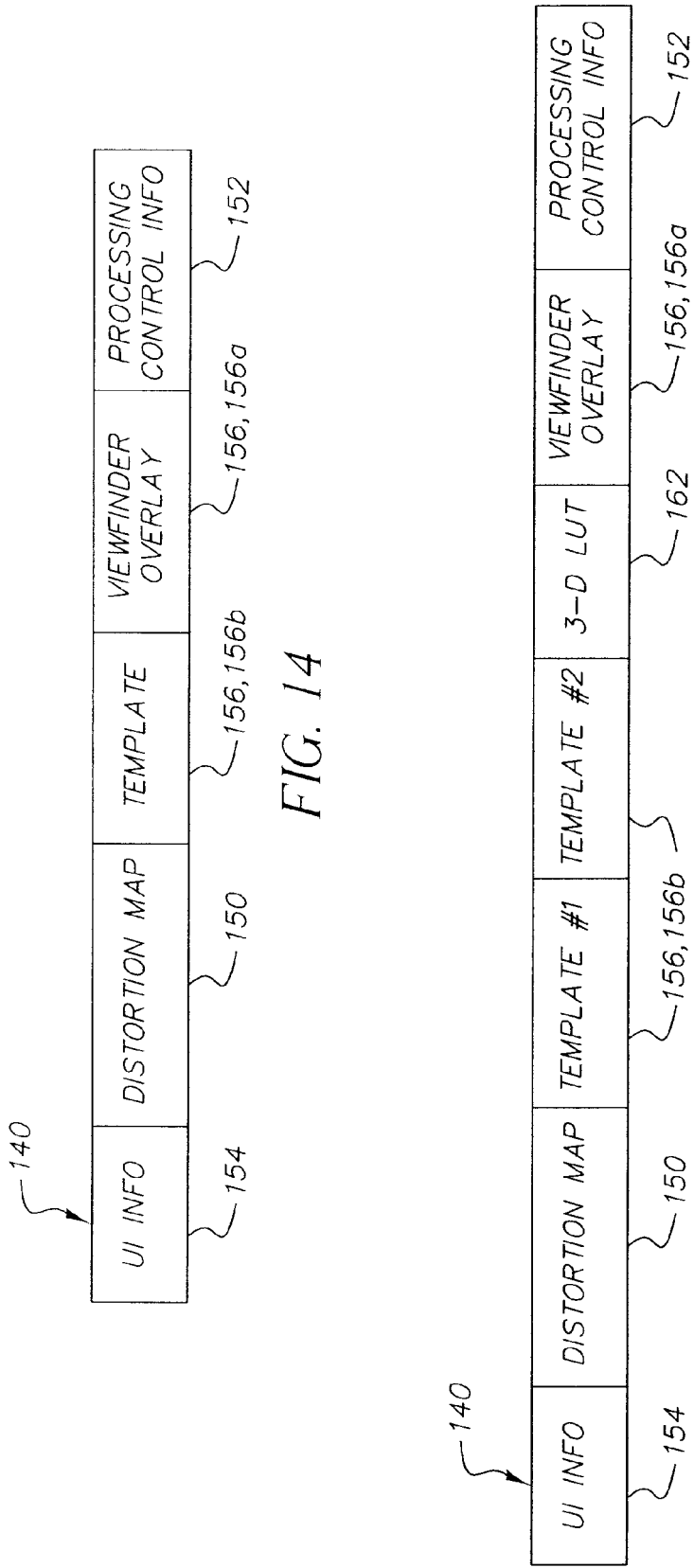

CAMERAS, OTHER IMAGING DEVICES, AND METHODS HAVING NON-UNIFORM IMAGE REMAPPING USING A SMALL DATA-SET OF DISTORTION VECTORS

CROSS-REFERENCE TO RELATED APPLICATIONS

This is a continuation of application Ser. No. 10/213,909, entitled CAMERAS, OTHER IMAGING DEVICES, AND METHODS HAVING NON-UNIFORM IMAGE REMAPPING USING A SMALL DATA-SET OF DISTORTION VECTORS, filed Aug. 7, 2002 now U.S. Pat. No. 7,301,568 in the names of Smith et al.

FIELD OF THE INVENTION

The invention relates to photography and photographic equipment and methods and more particularly relates to cameras, other imaging devices, and methods having non-uniform image remapping using a small data-set of distortion vectors.

BACKGROUND OF THE INVENTION

Some digital cameras include the ability to provide a template background into which an image is placed. This is described in U.S. Pat. No. 5,477,264. The described cameras also provide special modes that create monochrome or sepia colored images. Personal computer based software applications, such as Adobe PhotoDeluxe™, allow faces of captured images to be placed into existing images, such as moving a person's head to the body of someone in a historical scene. These programs also allow sections of an image to be stretched or shrunk. U.S. Pat. Nos. 6,097,901; 6,072,962; and 6,070,013 disclose cameras and systems in which all or a portion of a captured image is modified during photofinishing in accordance with a recorded encodement on a media unit. The effect or an image area subject to the effect is shown at the time of capture. The encodement can include algorithms or information necessary to generate algorithms required to produce the effect at photofinishing.

Cameras disclosed in U.S. Pat. No. 5,477,264 have a memory card, which includes files that are used during modification of a captured image. The files can include such information as: image processing software, look-up tables, matrices, compression tables, dynamic range optimization tables, and other files capable of affecting the captured image.

Space in digital memory units used in cameras and other imaging devices is always subject to many conflicting needs.

It would thus be desirable to provide improved cameras, other capture devices, and methods which provide for a non-uniform image modification using small data-sets that require little memory space.

SUMMARY OF THE INVENTION

The invention is defined by the claims. The invention, in its broader aspects, provides cameras, other imaging devices, and methods. In a particular embodiment a camera has a body and an electronic capture unit mounted in the body. The electronic capture unit selectively captures and stores a scene image as a representational electronic image having a first array of pixels. A control system is mounted in the body. The control system provides a remapped electronic image having a second array of pixels. A memory unit is disposed in the body. The memory unit stores a data-set defining an non-uniform mapping between a plurality of primary input coordinates mappable on said first array of pixels and plurality of primary output coordinates mappable on said second array of pixels. The control system uses the data-set to remap the pixels of the input electronic image to provide the remapped electronic image.

It is an advantageous effect of the invention that improved cameras, other capture devices, and methods are described which provide for a non-uniform image modifications using small data-sets that require little memory space.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein:

FIG. 14 is a diagram illustrating a first CIT file;

FIG. 15 is a diagram illustrating a second CIT file;

DETAILED DESCRIPTION OF THE INVENTION

In the method of the invention, a user selectively modifies a captured representational electronic image to produce a modified image. The modified image is immediately shown to the user on a display. The capture device uses a type of modification file referred to herein as a creative image transmogrification (also referred to as "CIT") to process the image, block by block, to create the modified image in a way that minimizes memory requirements. A photofinishing unit later provides a photofinishing product like the modified image shown on the display.

The term "representational image" is used herein to refer to an electronic image that has not been subjected to user selected modifications that are intended to render the image less realistic. The representational image is not necessarily unmodified relative to an electronic image as originally captured and digitized. For example, the representational image can be a product of color correction and white balancing of an initial electronic image.

Figure 1:
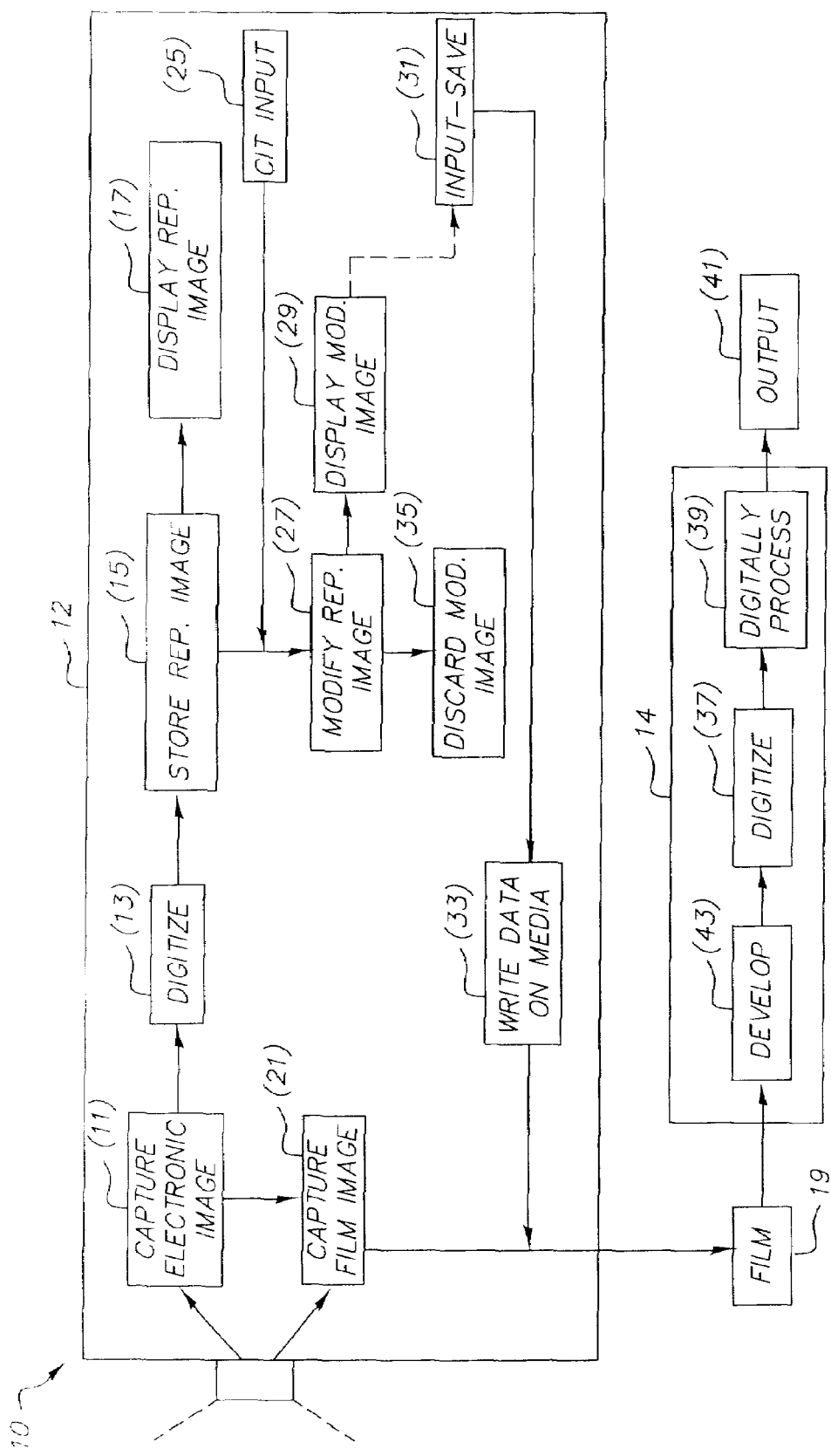
FIG. 1 is a diagrammatical view of a first embodiment of the system.
Figure 2:
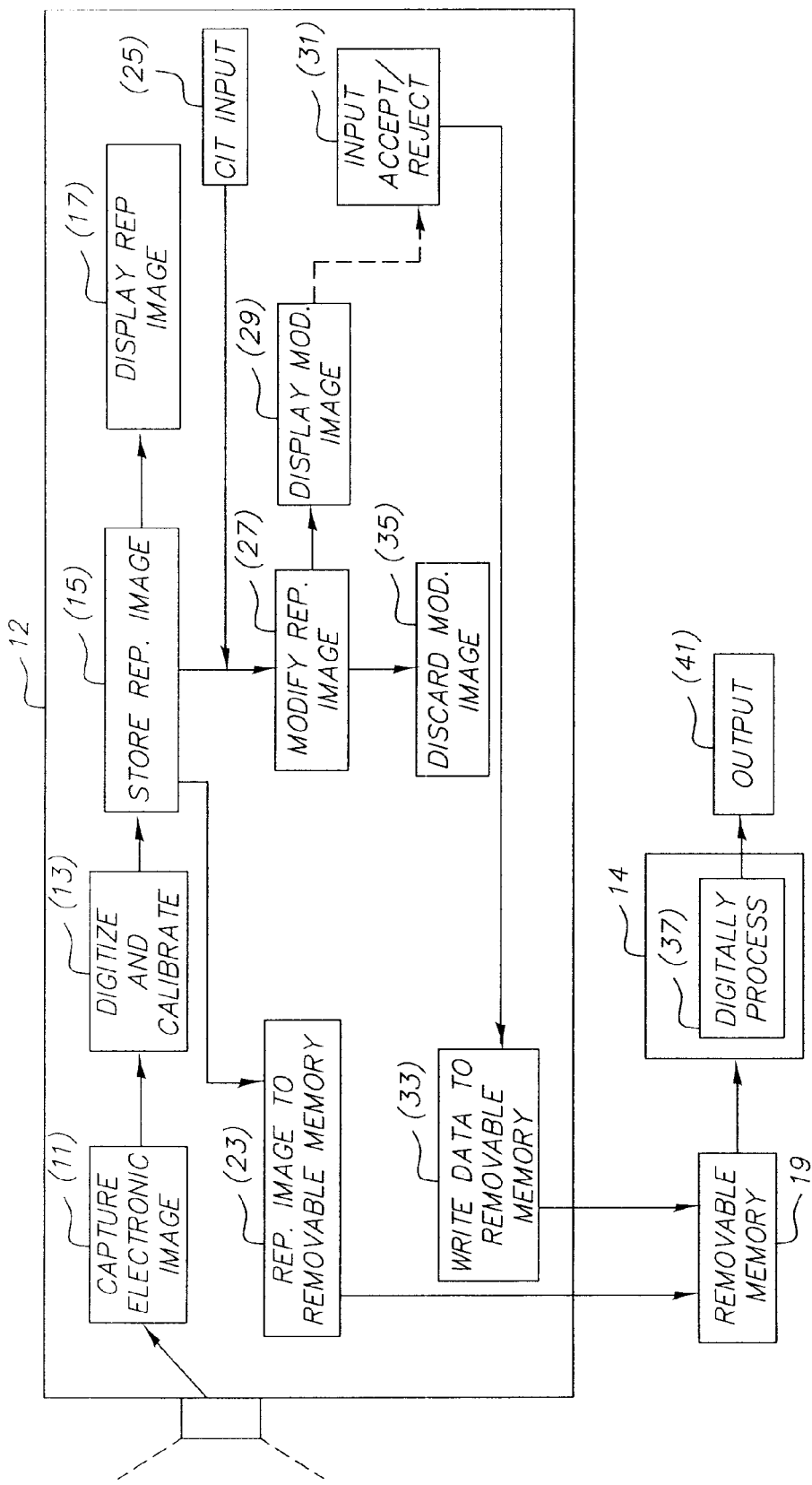
FIG. 2 is a diagrammatical view of a second embodiment of the system.

For convenience, the invention is generally described herein in terms of embodiments using a film-digital hybrid camera or a digital camera as a capture device 12 and a digital photofinishing unit that accepts film or digital media or both, as the photofinishing unit 14. FIG. 1 illustrates an embodiment having a hybrid camera 24. FIG. 2 illustrates an embodiment having a digital camera 24. Suitable digital photofinishing units having the features described herein are well known to those of skill in the art. Like considerations apply to other imaging devices, that capture and digitally process images, such as printing kiosks that incorporate a scanner.

Referring to embodiments shown in FIGS. 1-2, the system 10 of the invention has a capture device 12 and a photofinishing unit 14. The capture device 12 captures (11) a scene image as an electronic image, which is then digitized and processed (13) to provide a representational electronic image ("rep. image" in FIGS. 1-2). The representational image is temporarily stored (15) and is displayed (17) to the user.

The camera captures and stores an archival image on removable media 19. In the hybrid camera shown in FIG. 1, the removable media 19 is a photographic film unit and a latent film image is captured (21) concurrent with the capture (11) of the electronic image. In the digital camera shown in FIG. 2, the removable media is a removable memory unit and the archival image is a replica of the representational image that is copied (23) into the removable memory unit.

The camera accepts (25) a user input to the camera designating a CIT. The representational image is modified (27) and displayed (29). The camera accepts (31) a user input indicating that the modified image should be saved. In response, the camera writes (33) an identifier of the CIT to the removable media 19. The modified image is discarded (35).

After removal of the media 19 and transfer of the media to the photofinishing unit, the archival images are digitized (37), digitally processed (39), and output (41) to provide final images. Digital processing can include compensating for output media. With film, the filmstrip is developed (43) and digitized (45) prior to the digital processing.

The capture device 12 and photofinishing unit 14 can be a single structure or can be provided in the form of separate pieces of equipment. The first case is exemplified by a kiosk 18 (shown in FIG. 16), which includes a scanner 20 and a printer 22; or by a camera 24 that has a self-contained printer 22 (not shown). In the latter case, the capture device 12 is the camera 24 and the photofinishing unit 14 is a commercial wholesale or retail photofinishing equipment, a home printer, or the like. The photofinishing unit 14 can also be operative parts of a kiosk 18 used to print an earlier captured image.

Figure 3:
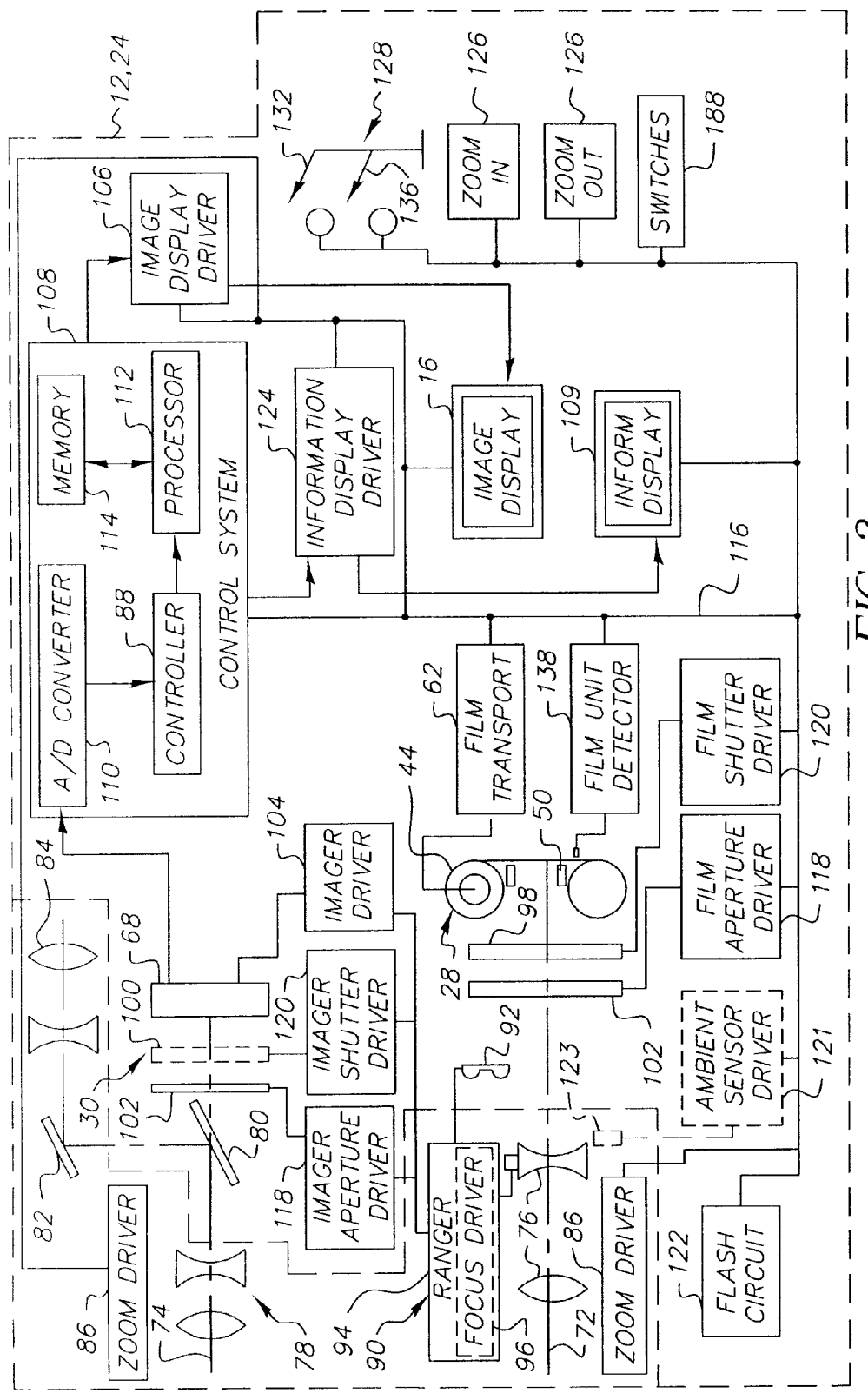
FIG. 3 is a diagrammatical view of the camera of FIG. 1.
Figure 4:
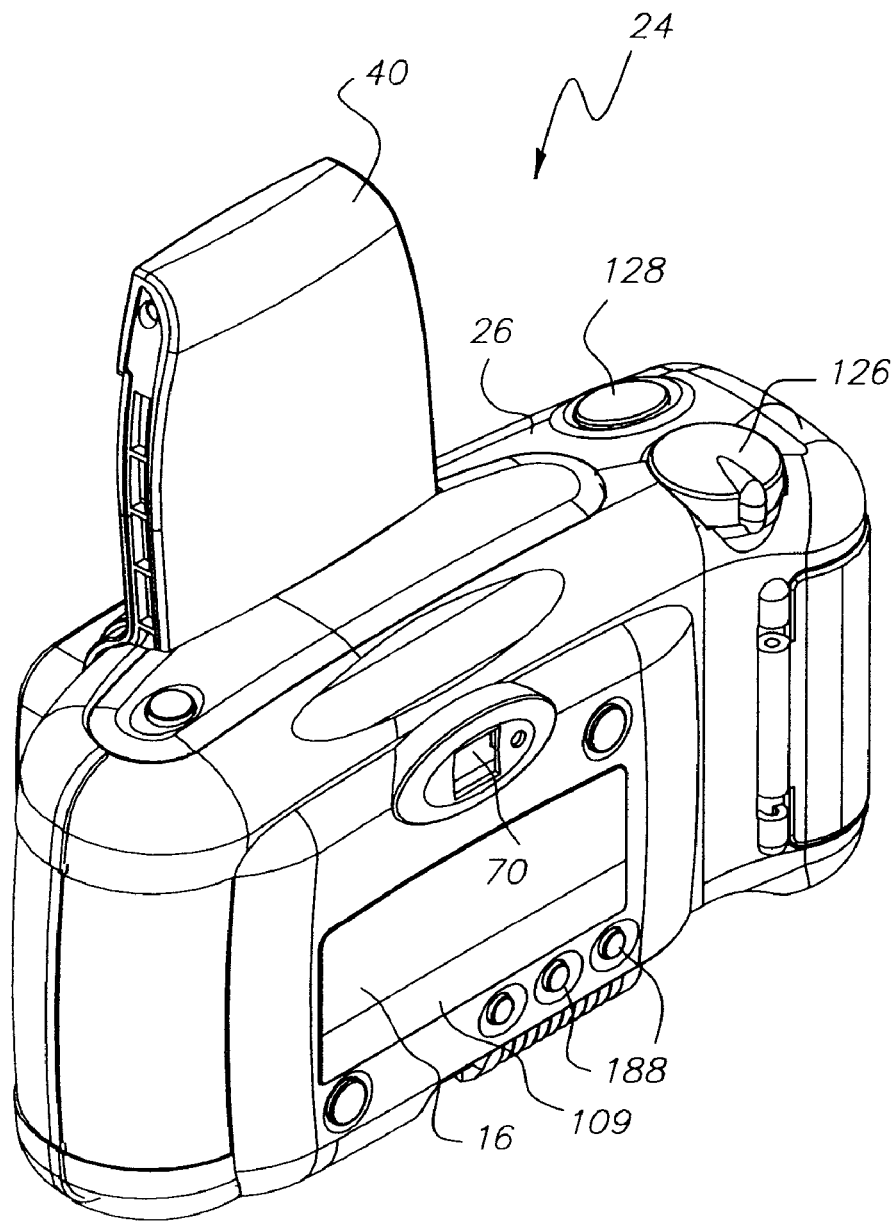
FIG. 4 is a perspective view of the camera of FIG. 3.
Figure 5:
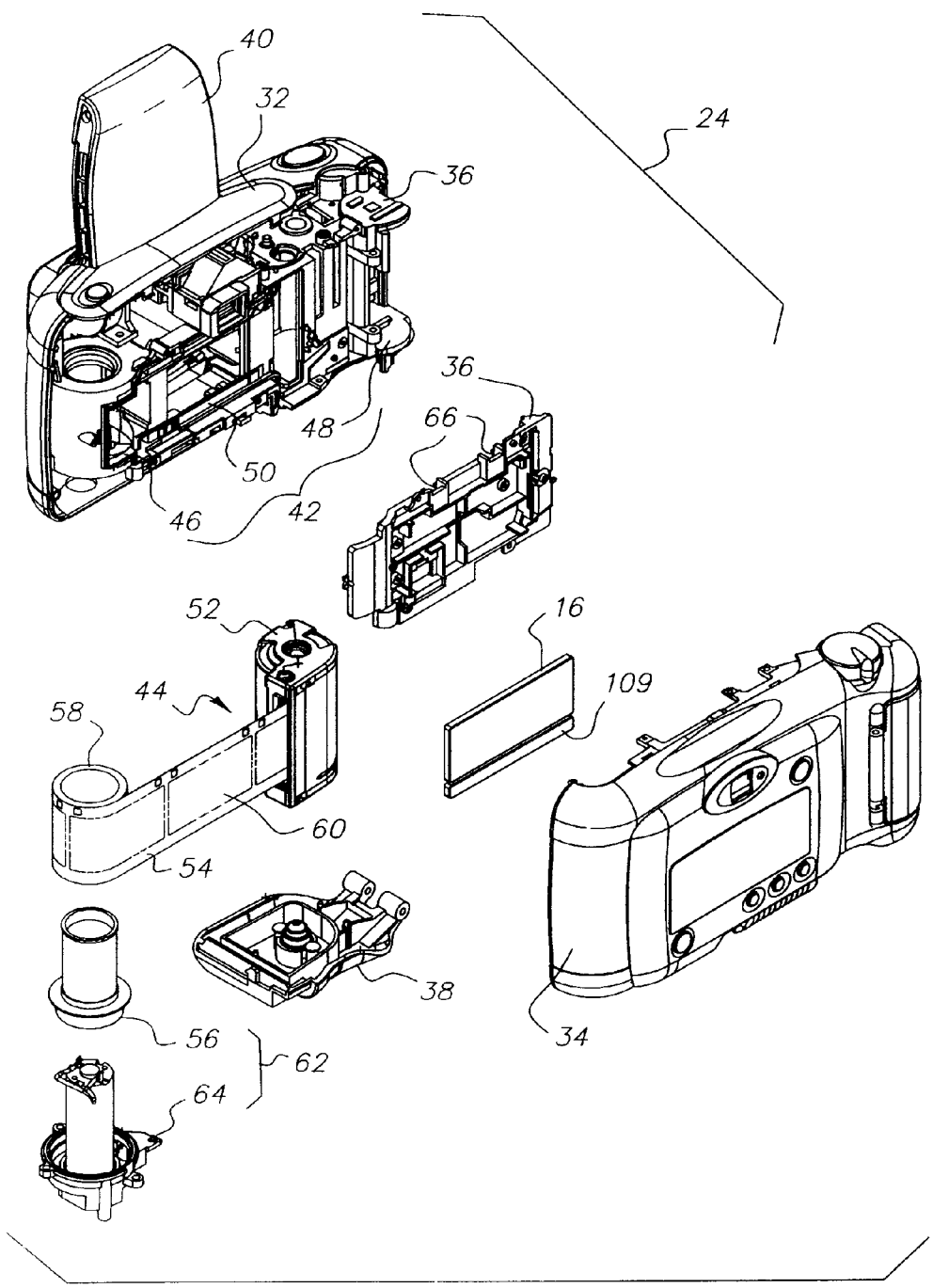
FIG. 5 is a partially exploded view of the camera of FIG. 3.

Referring now to FIGS. 3-5, the camera 24, in a particular embodiment, has a body 26 that holds an archival image capture unit 28 and an evaluation image capture unit 30. The two different capture units 28,30 can take a variety of forms and can be completely separate from each other or can share some or most components.

The evaluation image capture unit 30 captures a scene image electronically and can also be referred to as an electronic image capture unit. The archival image capture unit 28 can capture images electronically or on film, depending upon the embodiment. Cameras 24 are mostly discussed herein in relation to an archival image capture unit 28 that captures latent images using photographic film as the archival media. Such an archival image capture unit 28 can also be referred to as a "film image capture unit".

The body 26 provides structural support and protection for other components. The body 26 of the camera 24 can be varied to meet requirements of a particular use and style considerations. It is convenient if the body 26 has front and rear covers 32,34 joined together over a chassis 36. Many of the components of the camera 24 can be mounted to the chassis 36. A film door 38 and a flip-up flash unit 40 are pivotably joined to the covers 32,34 and chassis 36.

The archival image capture unit 28 has a film holder 42 that holds a film unit 44 during use. The configuration of the film holder 42 is a function of the type of film unit 44 used. The camera 24 shown in the figures, is film reloadable and uses an Advanced Photo System™ ("APS") film cartridge. This type of film unit 44 is convenient, but not limiting. For example, other types of film units 44 that can be used include Type 35 ("35 mm") and roll film.

The film holder 42 includes a pair of film chambers 46,48 and exposure frame 50 between the film chambers 46,48. The film unit 44 has a canister or holder 52 disposed in chamber 48. A filmstrip 54 is wound around the spool 56 held by the canister 52. During use, the filmstrip 54 extends across the exposure frame 50 and is wound into a film roll 58 in the other chamber 46. The exposure frame 50 has an opening through which a light image exposes a frame 60 of the film at each picture taking event.

The filmstrip 54 is moved across exposure frame 50 by a film transport 62. The film transport 62, as illustrated in FIG. 5, includes an electric motor 64 located within the supply spool 56. Other types of motorized transport mechanisms and manual transports can also be used. Latent image exposure can be on film advance or on rewind.

The camera 24 has an IX-DX code reader (not shown) to determine the film type and a data writer 66 that writes data on the magnetic layer of the APS film. This is a convenient approach, but is not limiting. Other types of data writer 66 that can be used, include optical writers, which form latent image data on the filmstrip 54 and electronic data writers, which write to electronic memory (not shown) in the film unit 44.

The electronic image capture unit 30 has an electronic array imager 68 that is mounted in the body 26 and is configured so as to capture the same scene as is captured in the latent image in the film unit. The type of imager 68 used may vary, but it is highly preferred that the imager 68 be one of the several solid-state imagers available. One highly popular type of solid-state imager commonly used is the charge coupled device ("CCD"). Of the several CCD types available, two allow easy electronic shuttering and thereby are preferable in this use. The first of these, the frame transfer CCD, allows charge generation due to photoactivity and then shifts all of the image charge into a light shielded, non-photosensitive area. This area is then clocked out to provide a sampled electronic image. The second type, the interline transfer CCD, also performs shuttering by shifting the charge, but shifts charge to an area above or below each image line so that there are as many storage areas as there are imaging lines. The storage lines are then shifted out in an appropriate manner. Each of these CCD imagers has both advantages and disadvantages, but all will work in this application. A typical CCD has separate components that act as clock drivers, analog signal processor 112 (ASP) and A/D converter 110. It is also possible to use an electronic image sensor manufactured with CMOS technology. This type of imager is attractive for use, since it is manufactured easily in a readily available solid-state process and lends itself to use with a single power supply. In addition, the process allows peripheral circuitry to be integrated onto the same semiconductor die. For example, a CMOS sensor can include clock drivers, analog signal processor 112 and A/D converter 110 components integrated on a single IC. A third type of sensor which can be used is a charge injection device (CID). This sensor differs from the others mentioned in that the charge is not shifted out of the device to be read. Reading is accomplished by shifting charge within the pixel. This allows a nondestructive read of any pixel in the array. If the device is externally shuttered, the array can be read repeatedly without destroying the image. Shuttering can be accomplished by external shutter or, without an external shutter, by injecting the charge into the substrate for recombination.

The electronic image capture unit 30 captures a three-color image. It is highly preferred that a single imager 68 be used that has a three-color filter (not separately illustrated); however, multiple monochromatic imagers and filters can be used. Suitable three-color filters are well known to those of skill in the art, and are usually incorporated with the imager to provide an integral component.

Figure 6:
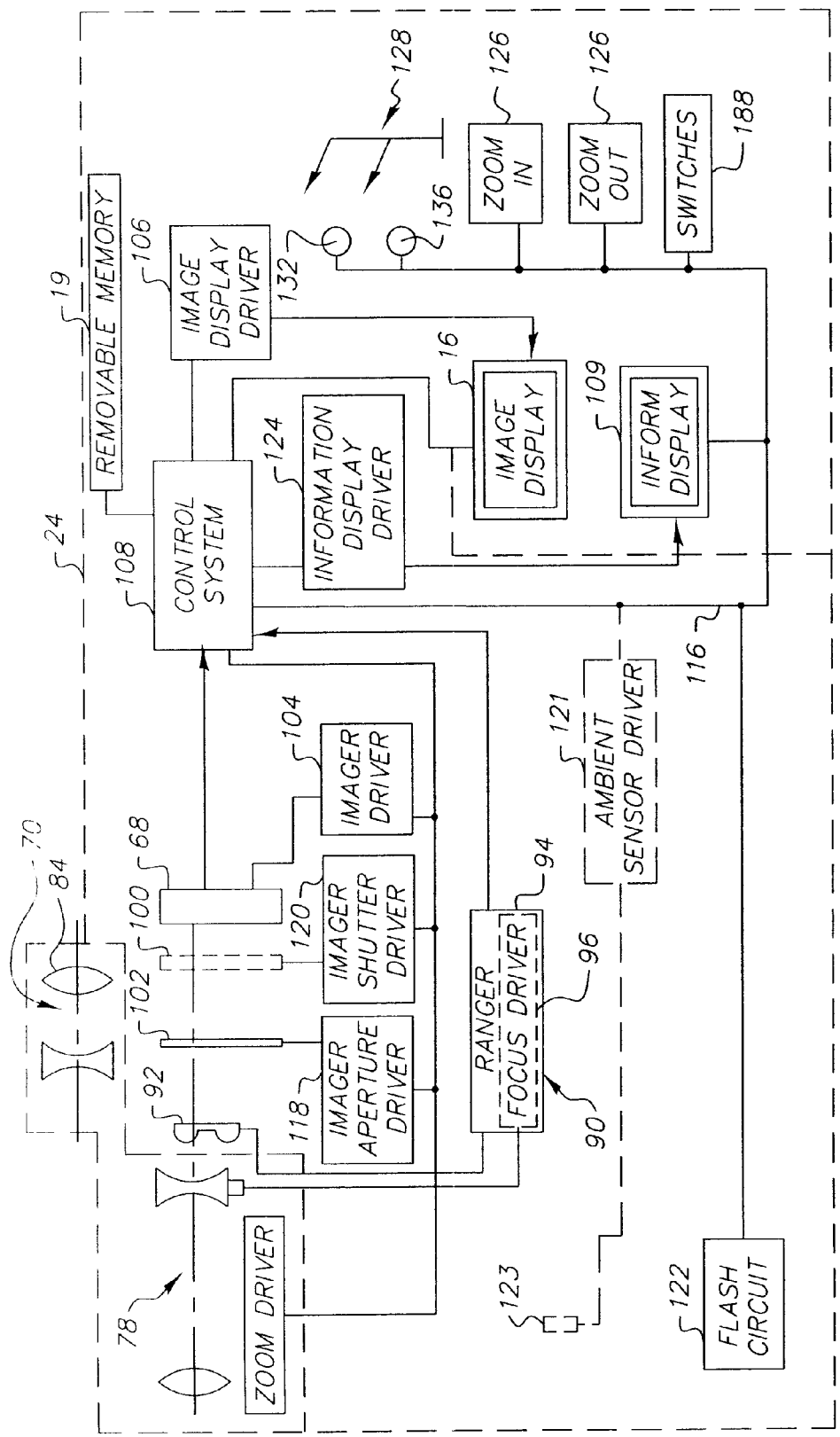
FIG. 6 is a diagrammatical view of the camera of FIG. 2.
Figure 7:
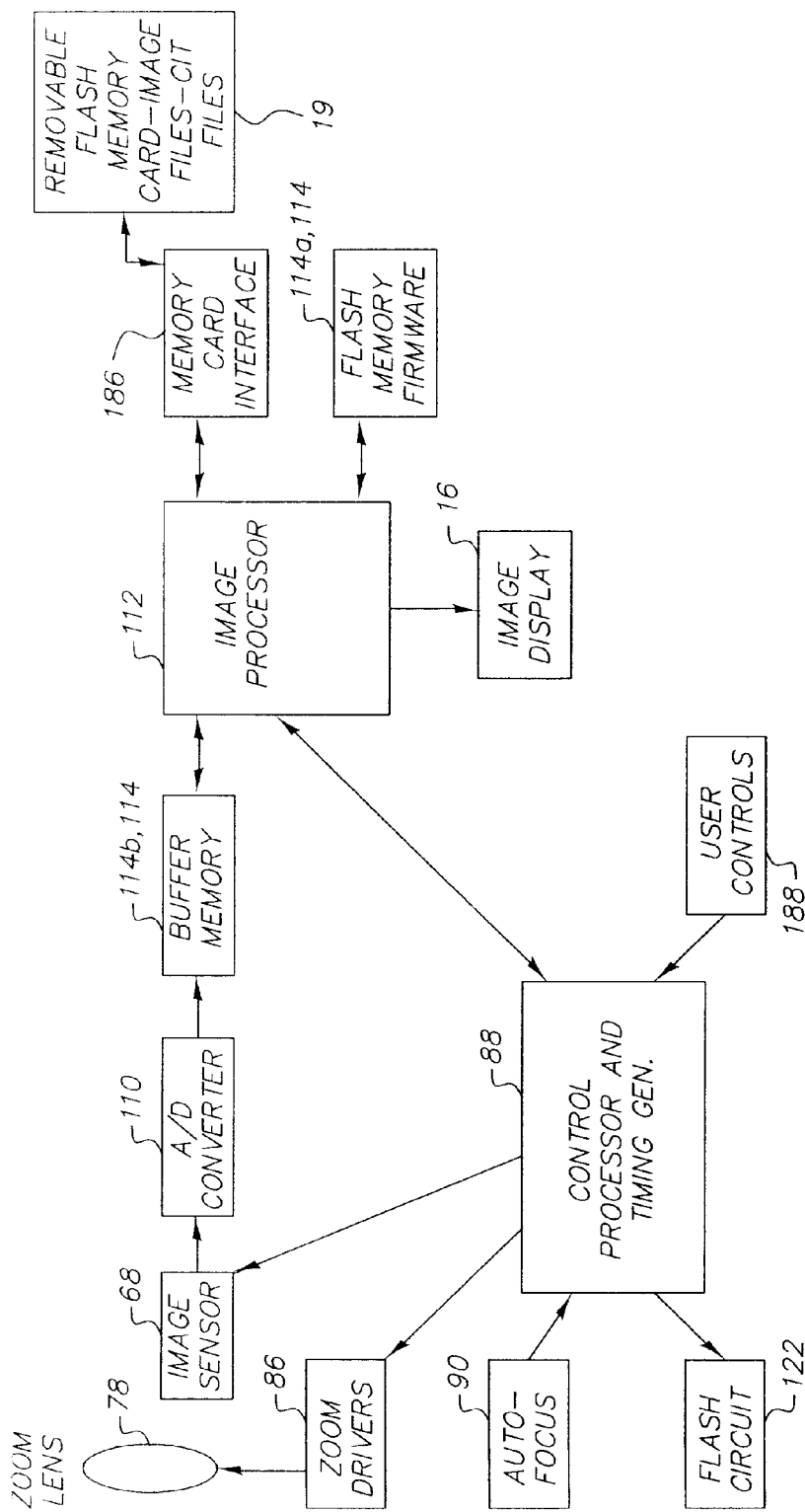
FIG. 7 is a simplified diagrammatical view of another embodiment of the digital camera.

Referring now primarily to FIGS. 3, 6, and 7, the camera 24 has an optical system 10 of one or more lenses mounted in the body 26. The optical system 10 is illustrated by a dashed line and several groups of lens elements. It will be understood that this is illustrative, not limiting. The optical system 10 directs light to the exposure frame 50 and to the electronic array imager 68. The optical system 10 also can direct light through a viewfinder 70 to the user. The imager 68 is spaced from the exposure frame 50, thus, the optical system 10 directs light along the first path (indicated by a dotted line 72) to the exposure frame 50 and along a second path (indicated by a dotted line 74) to the electronic array imager 68. Both paths 72,74 converge at a position in front of the camera 24, at the plane of the subject image. In FIG. 3, the optical system 10 has first and second paths that are in convergence at the subject image and extend to a taking lens unit 76 and a combined lens unit 78 that includes both an imager lens unit and a viewfinder lens unit. The combined lens unit 78 has a partially transmissive mirror 80 that subdivides the second light path 74 between an imager subpath to the imager 68 and a viewfinder subpath that is redirected by a fully reflective mirror 82 and transmitted through an eyepiece 84 to the photographer.

The optical system 10 can be varied. A viewfinder lens unit and an imager lens unit can be fully separate, or a combined lens unit can include both a taking lens unit and an imager lens unit (not shown). Other alternative optical systems can also be provided.

Referring again to the embodiment shown in FIG. 3, the taking lens unit 76 is a motorized zoom lens in which a mobile element or elements are driven, relative to a stationary element or elements, by a zoom driver 86. The combined lens unit 78 also has a mobile element or elements, driven, relative to a stationary element or elements, by a zoom driver 86. The different zoom drivers 86 are coupled so as to zoom to the same extent, either mechanically (not shown) or by a controller 88 signaling the zoom drivers 86 to move the zoom elements of the units over the same or comparable ranges of focal lengths at the same time. The controller 88 can take the form of an appropriately configured microcomputer, such as an embedded microprocessor 112 having RAM for data manipulation and general program execution.

The taking lens unit 76 of the embodiment of FIG. 3 is also autofocusing. An autofocusing system 90 has a sensor 92 that sends a signal to a ranger 94, which then operates a focus driver 96 to move one or more focusable elements (not separately illustrated) of the taking lens unit 76. The autofocus can be passive or active or a combination of the two.

The taking lens unit 76 can be simple, such as having a single focal length and manual focusing or a fixed focus, but this is not preferred. One or both of the viewfinder lens unit and imager lens unit can have a fixed focal length or one or both can zoom between different focal lengths. Digital zooming (enlargement of a digital image equivalent to optical zooming) can also be used instead of or in combination with optical zooming for the imager 68. The imager 68 and display 16 can be used as a viewfinder 70 prior to image capture in place of or in combination with the optical viewfinder 70.

Although the camera 24 can be used in other manners, the archival image is intended to provide the basis of the photofinished final image desired by the user and the verification image is intended to provide a check on the results that will be later provided in the final image. The verification image thus does not have to have the same quality as the archival image. As a result, with the camera 24 of FIG. 3, the imager 68 and the portion of the optical system 10 directing light to the imager 68 can be made smaller, simpler, and lighter. For example, the taking lens unit 76 can be focusable and the imager 68 lens unit can have a fixed focus or can focus over a different range or between a smaller number of focus positions.

A film shutter 98 shutters the light path to the exposure frame 50. An imager shutter 100 shutters the light path to the imager 68. Diaphragms/aperture plates 102 can also be provided in both of the paths. Each of the shutters 98,100 is switchable between an open state and a closed state. The term "shutter" is used in a broad sense to refer to physical and/or logical elements that provide the function of allowing the passage of light along a light path to a filmstrip 54 or imager 68 for image capture and disallowing that passage at other times. "Shutter" is thus inclusive of, but not limited to, mechanical and electromechanical shutters of all types. "Shutter" is not inclusive of film transports and like mechanisms that simply move film or an imager in and out of the light path. "Shutter" is inclusive of computer software and hardware features of electronic array imagers that allow an imaging operation to be started and stopped under control of the camera controller 88.

In currently preferred embodiments, the film shutter 98 is mechanical or electromechanical and the imager shutter 100 is mechanical or electronic. The imager shutter 100 is illustrated by dashed lines to indicate both the position of a mechanical imager shutter 100 and the function of an electronic shutter. When using a CCD, electronic shuttering of the imager can be provided by shifting the accumulated charge under a light shield. This may be a full contiguous frame storage region as in a frame transfer device CCD or vertical storage rows in an interline transfer device CCD. Suitable devices and procedures are well known to those of skill in the art. When using a CID, the charge on each pixel is injected into a substrate at the beginning of the exposure. At the end of the exposure, the charge in each pixel is read. The difficulty encountered here is that the first pixel read has less exposure time than the last pixel read. The amount of difference is the time required to read the entire array. This may or may not be significant depending upon the total exposure time and the maximum time needed to read the entire array. CMOS imagers are commonly shuttered by a method called a rolling shutter. CMOS imagers using this method are not preferred, since this shutters each individual line to a common shutter time, but the exposure time for each line begins sequentially. This means that even with a short exposure time, moving objects will be distorted. Given horizontal motion, vertical features will image diagonally due to the temporal differences in the line-by-line exposure. Another method for shuttering CMOS imagers is described in U.S. Pat. No. 5,966,297. In this method, called single frame capture mode, all pixels are allowed to integrate charge during exposure time. At the end of the exposure time, all pixels are simultaneously transferred to the floating diffusion of the device. At this point sequential read out by lines is possible.

The imager 68 receives a light image (the subject image) and converts the light image to an analog electrical signal, an electronic image that is also referred to here as the initial verification image. (For convenience, the electronic image is generally discussed herein in the singular.) The electronic imager 68 is operated by the imager driver 104. The electronic image is ultimately transmitted to the image display 16, which is operated by an image display driver 106. Between the imager 68 and the image display 16 is a control system 108.

The control system 108 controls other components of the camera 24 and performs processing related to the electronic image. The control system 108 shown in FIG. 3 includes controller 88, an A/D converter 110, an image processor 112, and memory 114. Suitable components for the control system 108 are known to those of skill in the art. Modifications of the control system 108 are practical, such as those described elsewhere herein.

"Memory" refers to one or more suitably sized logical units of physical memory. The transfer of images in digital form can be on physical media or as a transmitted electronic signal. Except as indicated, the type or types of memory used and the manner of information storage, such as optical or magnetic or electronic, is not important. For example, the memory can be an internal semiconductor memory or magnetic memory, such as a Flash EPROM memory; or alternately a removable memory, such as a Compact Flash card, floppy disc, a CD, a DVD, a tape cassette, or flash memory card or stick. Memory types can be used in any combination.

The controller 88 and image processor 112 can be controlled by software stored in the same physical memory that is used for image storage, but it is preferred that the processor 112 and controller 88 are controlled by firmware stored in dedicated memory 114a, for example, in a ROM or EPROM firmware memory (not separately illustrated).

The initial electronic image is amplified and converted by an analog to digital (A/D) converter-amplifier 110 to a digital electronic image, which is then processed in the image processor 112 and stored in image or buffer memory 114b. Basic processing, that is processing related to improving the image and matching the image to photofinishing output characteristics, results in the representational image. For example, the electronic image can be processed to provide color and tone correction and edge enhancement.

Signal lines, illustrated as a data bus 116, electronically connect the imager 68, controller 88, processor 112, the image display 16, and other electronic components. The controller 88 includes a timing generator that supplies control signals for all electronic components in timing relationship. Calibration values for the individual camera 24, such as values to compensate for mechanical manufacturing variations, are stored in a calibration memory (not separately illustrated), such as an EEPROM, and supplied to the controller 88. The controller 88 operates the drivers and memories, including the zoom drivers 86, focus driver 96, aperture drivers 118, and film and imager shutter drivers 120. The controller 88 connects to a flash circuit 122 that mediates flash functions of the flash unit 40. The imager 68 can be used as an ambient sensor to set shutter speeds and other exposure values or a separate ambient sensor driver 121 and ambient sensor 123 can be provided as indicated in dashed lines in FIG. 3. It will be understood that the circuits shown and described can be modified in a variety of ways well known to those of skill in the art. It will also be understood that the various features described here in terms of physical circuits can be alternatively provided as firmware or software functions executed on a programmable processor, or a combination of the two. Likewise, components illustrated as separate units herein may be conveniently combined or shared in some embodiments.

The display 16 is driven by the image display driver 106 and, using the output of the processor 112, produces a display image that is viewed by the user. The controller 88 facilitates the transfers of the electronic image between the electronic components and provides other control functions, as necessary.

The control system 108 also provides digital processing that compensates the representational image to the display 16. The compensation can include conversion of the electronic image to accommodate differences in characteristics of the different components. For example, a transform can be provided that modifies each image to accommodate the different capabilities in terms of gray scale and dynamic range, color gamut, and white point of the display 16 and the image provided by the imager 68. The compensation relates to component characteristics and thus is invariant from image to image.

The compensated digital image can be further compensated to match output characteristics of the selected photofinishing channel to provide a matched digital image. Photofinishing related adjustments assume foreknowledge of the photofinishing procedures that will be followed for a particular unit of capture media. This foreknowledge can be made available by limiting photofinishing options for a particular capture media unit or by standardizing all available photofinishing or by requiring the user to mandate a photofinishing choice and then marking the film unit with that choice. This designation can then direct the usage of particular photofinishing options and can provide for a direct or indirect indication of the effect of a particular option in the verification image. The application of a designation on a capture media unit could be provided by a number of means known to those in the art, such as application of a magnetic or optical code. Difference adjustments can be applied anywhere in the electronic imaging chain within the camera. Where the difference adjustments are applied in a particular embodiment is largely a matter of convenience and the constraints imposed by other features of the camera. For example, photofinishing difference adjustments can be provided in a look-up table that is keyed to a selection of a photofinishing choice by the user. The controller 88 alters the color value in accordance with the selected adjustment.

The controller 88 can be provided as a single component or as multiple components of equivalent function in distributed locations. The same considerations apply to the processor 112 and other components. Likewise, components illustrated as separate units herein may be conveniently combined or shared in some embodiments.

Different types of image display 16 can be used. For example, the display 16 can be a liquid crystal display ("LCD"), a cathode ray tube display, or an organic electroluminescent display ("OELD"; also referred to as an organic light emitting display, "OLED"). It is also preferred that the image display 16 is operated on demand by actuation of a switch (not separately illustrated) and that the image display 16 is turned off by a timer or by initial depression of the shutter release 128. The timer can be provided as a function of the controller 88. The display 16 is preferably mounted on the back or top of the body 26, so as to be readily viewable by the photographer immediately following a picture taking. One or more information displays 109 can be provided on the body 26, to present camera information to the photographer, such as exposures remaining, battery state, printing format (such as C, H, or P), flash state, and the like. The information display 109 is operated by an information display driver 124. Instead of an information display 109, this information can also be provided on the image display 16 as a superimposition on the image or alternately instead of the image (not illustrated).

The image display 16, as shown in FIG. 4, is mounted to the back of the body 26. An information display 109 is mounted to the body 26 adjacent the image display 16 so that the two displays form part of a single user interface that can be viewed by the photographer in a single glance. The image display 16 and an information display 109 can be mounted instead or additionally so as to be viewable through the viewfinder 70 as a virtual display 16 (not shown). The image display 16 can also be used instead of or in addition to an optical viewfinder 70.

It is preferred that the imager 68 captures and the image display 16 shows substantially the same geometric extent of the subject image as the latent image, since the photographer can verify only what is shown in the display 16. For this reason it is preferred that the display 16 show from 85-100 percent of the latent image, or more preferably from 95-100 percent of the latent image.

Referring now particularly to FIG. 3, the user interface of the camera 24 has user controls including "zoom in" and "zoom out" buttons 126 that control the zooming of the lens units, and the shutter release 128. The shutter release 128 operates both shutters 98,100. To take a picture, the shutter release 128 is actuated by the user and trips from a set state to an intermediate state, and then to a released state. The shutter release 128 is typically actuated by pushing, and, for convenience the shutter release 128 is generally described herein in relation to a shutter button that is initially depressed through a "first stroke", to actuate a first switch 132 and alter the shutter release 128 from the set state to the intermediate state and is further depressed through a "second stroke", to actuate a second switch 136 and alter the shutter release 128 from the intermediate state to the released state. Like other two stroke shutter releases well known in the art, the first stroke actuates automatic setting of exposure parameters, such as autofocus, autoexposure, and flash unit readying; and the second stroke actuates image capture.

In particular embodiments, one or more electronic images are captured prior to capture of the archival image. The captured electronic image data from one or more of these preview images is sampled and scene parameters, such as automatic setting of shutter speeds and diaphragm settings, can be determined from that data. The preview images can also be processed and sent to the display 16; thus allowing use of the display 16 as an electronic viewfinder. The preview electronic images can be captured in a continuing sequence as long as the capture system 10 is in a preview mode. For example, preview images can be captured, seratim, as long as the shutter release 128 is actuated through the first stroke and is maintained in that position. This capture of preview images ends when the shutter release 128 is returned to a stand-by position or is actuated through the second stroke for archival image capture. The preview electronic images could be saved to memory; but, except as otherwise described here, are ordinarily discarded one after another when the replacement electronic image is captured, to reduce memory usage.

Referring now to FIG. 3, when the shutter release 128 is pressed to the first stroke, the taking lens unit 76 and combined lens unit 78 are each autofocused to a detected subject distance based on subject distance data sent by the autoranging unit ("ranger 94" in FIG. 3) to the controller 88. The controller 88 also receives data indicating what focal length the zoom lens units are set at from one or both of the zoom drivers 86 or a zoom sensor (not shown). The camera 24 also detects the film speed of the film unit 44 loaded in the camera 24 using a film unit detector 138 and relays this information to the controller 88. The camera 24 obtains scene brightness (Bv) from a discrete light meter or from components that analyze a signal from the imager 68. The scene brightness and other exposure parameters are provided to an algorithm in the controller 88, which determines a focused distance, shutter speeds, apertures, and optionally a gain setting for amplification of the analog signal provided by the imager 68. Appropriate signals for these values are sent to the focus driver 96, film and imager aperture drivers 118, and film and imager shutter drivers 120 via a motor driver interface (not shown) of the controller 88. The gain setting is sent to the A/D converter-amplifier 110.

In the camera 24 shown in FIG. 3, the captured film image provides the archival image. In an alternative embodiment shown in FIG. 6, the archival image is an electronic image and the capture media is removable and rewritable memory. In this embodiment, an electronic image is captured and then replicated. The first electronic image is used as the verification image; the second electronic image is stored on the capture media to provide the archival image. An embodiment of the system 10 using such a digital camera, as shown in FIG. 2, is otherwise like the system 10 as earlier described, with the exception that photofinishing does not include chemical development and digitization. With a fully electronic camera 24, the verifying image can be a sampled, low resolution subset of the archival image or a second lower resolution electronic array imager (not illustrated) can be used. The low resolution subset of the archival image can be provided using the method described in commonly-assigned U.S. Pat. No. 5,164,831 "ELECTRONIC STILL CAMERA 24 PROVIDING MULTI-FORMAT STORAGE OF FULL AND REDUCED RESOLUTION IMAGES" to Kuchta, et. al., the disclosure of which is herein incorporated by reference.

The camera 24 is not limited in terms of general features. For example, various types of one or two chamber film cartridge or roll film can be used. Similarly, the data writer 66 is not limited to writing magnetically on the film. For example, the data writer 66 can write optically on the film, or magnetically or optically on an appropriately configured holder or other portion of the film unit 44. Likewise, the data writer 66 can, by wires or wirelessly, write electronically on a memory unit attached to or associated with the film unit 44.

The archival image capture unit 28 can use digital media, such as a write-once compact disc, rather than photographic film. With digital archival media, the electronic image can also be modified in the same manner as in other digital cameras 24 to enhance the representational image. For example, white balance can be corrected. Corrections that will not be reproduced in the photofinishing product are undesirable, since this reduces the reliability of the verification image as a representation of the final image produced by photofinishing. Digital processing of an electronic archival image can include modifications related to file transfer, such as JPEG compression and file formatting.

Figure 17:
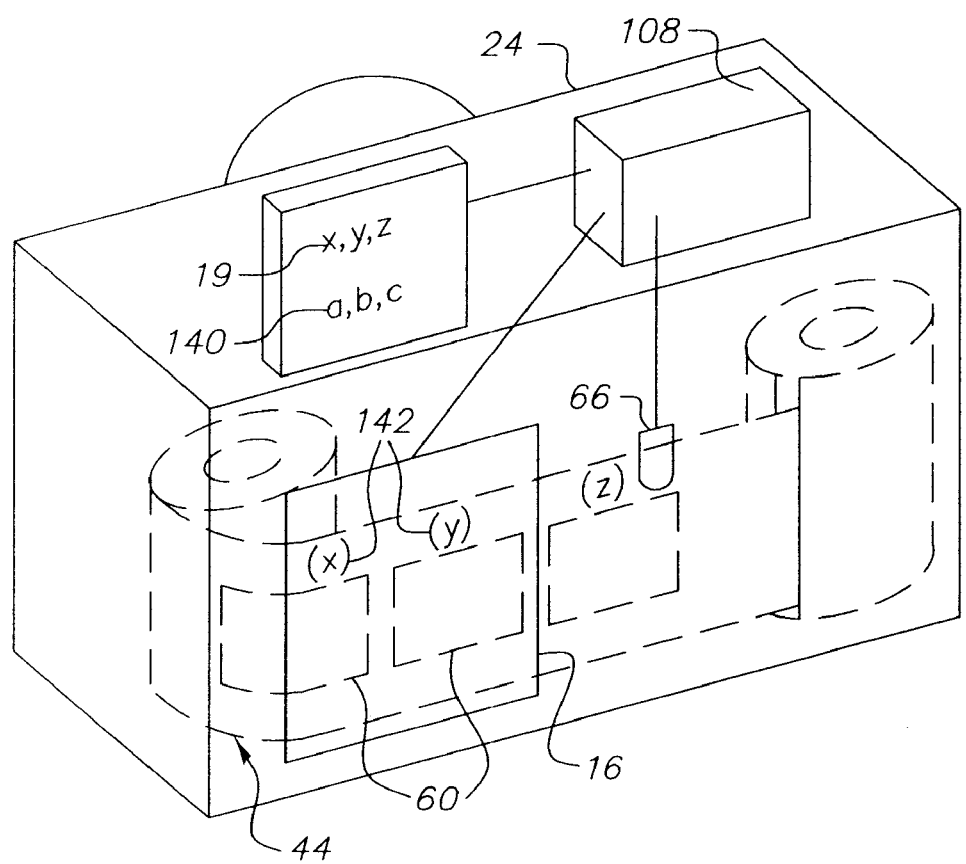
FIG. 17 is a semi-diagrammatical view of an embodiment of a camera that displays modified images and writes CIT codes to frames of a filmstrip.

Referring now to FIG. 17, the camera 24 provides a number of different creative image "transmogrifications 140" (also referred to herein as "CIT's 140"), which define image modifications that include distortion. CIT's 140 are represented in FIG. 17 by the letters "X, Y, Z, A, B, C". Each CIT 140 provides a modification that relocates one or more portions of a representational image. Other types of modifications can also be included, and a CIT 140 can include multiple modifications in any combination, within practical limits. Thus, a portion of a captured image can be copied, altered, repositioned, and merged into the original captured image or into a template 156 that replaces part of the original captured image. For example, the center of an image can be replicated and mirrored to have a kaleidoscope-like appearance or a final image can show a hand and pencil redrawing part of a captured scene as an outline image on a pad of paper. Multiple representational images can also be combined into a single final image, for example by replicating the same person's head several times, and merging it onto different people in a template 156 background.

A modified image produced using a CIT 140 is shown to the user on the camera display 16 immediately after the CIT 140 is applied, or upon reactivation of the display 16 following automatic deactivation to save energy. The modified image can be saved in memory for later review and can also be retained for use as a final image. The latter is not preferred, because the modified image takes up considerable space in memory, and this space is additional to that required for the archival image, unless that image is discarded. Space can be saved by lowering the resolution of the modified image, but this would result in a low resolution final image prepared from the modified image.

Figure 18:
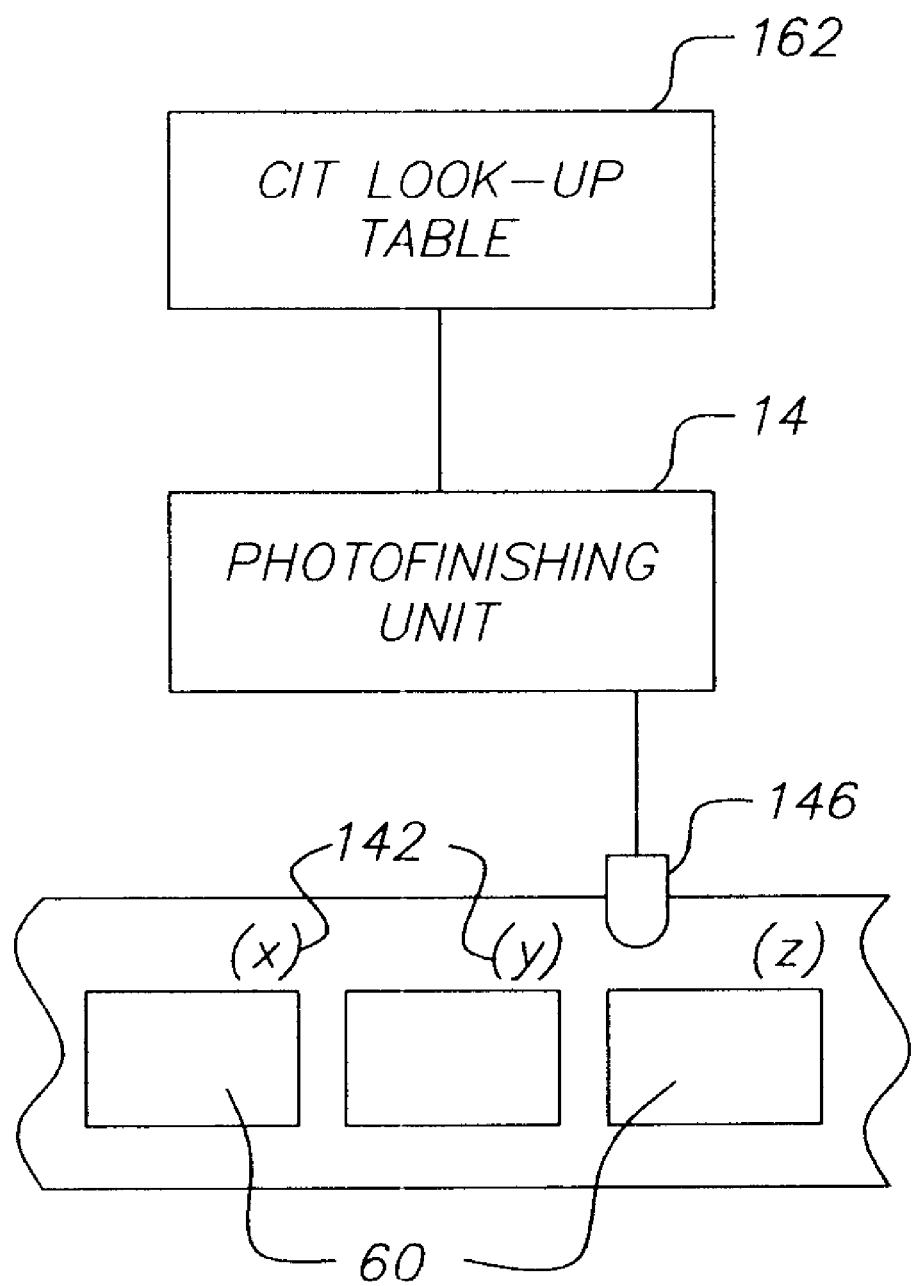
FIG. 18 is a diagrammatical view of a photofinishing system that reads CIT codes recorded on a filmstrip and provides modified photofinishing in accordance with a CIT look-up table.

An approach that saves memory space, is to use the archival image to recreate the modified image when needed. The respective CIT 140 is associated with the archival image and is reapplied as needed. Each digital archival image can have a CIT 140 recorded with it, in the same file or an associated file. This can be more efficient than saving a modified image, but is not optimal for memory space conservation. Alternatively, an identifier 142 indicating that a particular CIT 140 was used is stored along with each digital or film archival image. Identifiers 142 for CIT's 140: "X", "Y", "Z" are illustrated in FIG. 17 by the terms "(X)", "(Y)", and "(Z)", which, in the embodiment shown, physically adjoin respective film frames 60 bearing archival images. Use of identifiers 142 greatly conserves space relative to saving modified images, but does require downstream photofinishing equipment 14 to be able to decode the identifiers 142 and access the required CIT's 140. Referring to FIG. 18, this requires a reader 146 for the identifier 142 and a local or remotely accessible database or look-up table 148 or the like that can provide the required CIT's 140 to the photofinishing unit 14.

With a photographic film archival image, the encodement for the CIT 140 can be written to the filmstrip 54 itself or can be stored in memory on or associated with the film unit 44. For example, with APS film, the code can be written onto the magnetic track of the APS film frame which was captured.

A digital archival image can be handled in the same manner. The CIT 140 is recorded in association with the digital archival image, but the archival image otherwise remains unchanged. This reduces the size of image files. In a hybrid or digital camera, the modified image can be temporarily retained as memory space permits or can be immediately discarded after viewing and be provided repeatedly as needed. In any case, the discarding of the modified image does not effect the respective archival image and associated encodement for the CIT 140. As discussed elsewhere, due to the limits of the display 16, the image provided to the display 16 can be at relatively low resolution.

A processor 112 in a photofinishing unit 14 (for example, a digital photofinishing system for a hybrid camera, or a computer (not shown) for a docking digital camera) uses the CIT code to retrieve the indicated CIT from a local or remote database or look up table 148. The look up table 148 is available to the photofinishing unit as needed and is not a part of the camera. The CIT's in the look up table 148 correspond to those in the camera 24 and enables the processor 112 to provide a high quality rendition of the special effect shown to the user on the camera display.

A digital camera 24 can provide the user with the option of selecting whether to store a modified image in addition to or instead of the corresponding archival image as a JPEG file using the digital media. This can replace storing of the CIT code or can be provided as an option additional to storing the CIT code.

CIT's 140 are generally discussed herein in relation to cameras. Camera CIT's provide displayable images that approximate the effects of photofinishing CIT's. CIT's can be set up for use in cameras and can be ported to photofinishing units without change. In that case, some of the content of CIT's will not be useful in the photofinishing units, such as capture templates 156. Likewise control information may not be applicable. Surplus information can be ignored or removed or replaced, as appropriate. Similarly, features used in photofinishing can be ignored by cameras or implemented in a different manner. For example, as discussed below, the camera and photofinishing unit can provide the same effect at different resolutions. CIT's can alternatively differ between cameras and photofinishing units with each limited to appropriate features for correlated effects and both associated with the same identifier.

Each CIT 140 includes an image distortion map 150. The image distortion map 150 describes which pixels of the original image are used to provide each block of output pixels. The distortion map 150 is non-uniform, that is, the map 150 defines a distortion that relocates some, but not all of the pixels of the representational image. Each CIT 140 is used with control information 152 needed for implementing the CIT 140 in the camera 24 and information 154 needed for the user interface. A CIT 140 can also be used with one or more templates 156 that are used to guide, capture, and/or replace part of the representational image. A capture template or viewfinder overlay 156a provides a reticle that is used during image capture. The portion of the original image that will appear in final image is indicated in the display 16 by the reticle. The reticle can be a line or set of marks, or the like or can be some other discontinuity. For example, the display 16 can show the areas that will be retained in the final image in normal brightness color and the areas that will be occluded by the template 156a as dimmer areas or in black and white.

With a capture template 156a the location of the subject in a captured image is preset. The user composes the captured image on that basis. Alternatively, techniques can be used to automatically extract the subject from the background of an image. An example of such a technique is disclosed in U.S. Pat. No. 5,914,748, entitled "Method and apparatus for generating a composite image using the difference of two images".

A replacement template 156b provides a stored image that replaces a corresponding portion of the output image. The other portion of the output image occupies an opening 158 in the replacement template 156b and, thus, is visible in the final image. The replacement template 156b can have a fixed position within an image frame or can be adjustable. For example, a CIT 140 can have a capture template 156a that shows how to locate a person's face for capture, a distortion map 150 that greatly enlarges the eyes and mouth of the captured portrait, and a pair of replacement templates (not shown) in the form of optional clown hat overlays.

The control information 152, user interface information 154, and template images 156 can be provided within the CIT 140 or can be supplied by the capture device 12 independent of the CIT 140 file. The latter is more limiting, since it is impractical to individualize features for every CIT 140, but has the advantage of reducing the space required for each CIT 140. Multiple CIT's 140 or portions of CIT's 140 can be provided in a single file, but it is generally more convenient to provide each CIT 140 in an individual file. Such CIT's can be quite small, thus the number of CIT's 140 in one or more memory units of a capture device 12 is not greatly constrained and can be one or a large number, within the limits of available memory space and the need to save most of the space for captured images. In the illustrated embodiments, each CIT 140 is a separate file stored on the removable memory unit 19.

A CIT 140 can also include one or more additional modifications (not illustrated). Each of these modification can be applied overall or can be tied to the image distortion map 150. Alternatively, a modification can incorporate an auxiliary pixel map defining an area of application in terms of individual pixels or blocks 184 of pixels. The additional modifications can be applied to output pixels or can be applied to input pixels and then carried forward to output pixels. Examples of additional modifications are color processing, such as: normal color, false color using a predefined palette, saturated color, and monochrome.

A look-up table 162 can be included in the CIT 140 file to detect specific colors in the image, in order to select between two or more different background templates 156, or the captured image. Alternately, (or in addition for the area of the output image provided by the captured image) the look-up table can completely remap the colors, for example by: making the sky red and the grass yellow; changing all of the colors to pastels; or mapping the colors to a small set of primary colors.

Referring to FIGS. 14-15, first and second examples of CIT 140 files have graphical user interface information 154 ("UI info"), a distortion map 150, replacement templates 156b and viewfinder overlays 156a and processing control information 152. The second CIT 140 file also has a three-dimensional look-up table 162 ("3-D LUT") used for alternative image processing.

The following are examples of effects that can be provided by CIT's 140. Texture mapping can be applied to all or part of a scene, such as adding patterns such as brick walls with graffiti. Special lighting can be simulated. For example, in a "flashlight CIT", most of the pixels in the image can be darkened, except for a circular area that is at full brightness and a template can be provided showing a flashlight pointing to the circle. A few bright pixels can be provided forming a line to outline the beam of light. In other examples, the flashlight can be replaced with different colored lights, a rainbow effect, a star-burst effect, partial blurs, and the like. Multiple exposure images can be used with a predefined template for creating composite output images. For example, the first image is used for the right side, and the second is used for the left.

Figure 8:
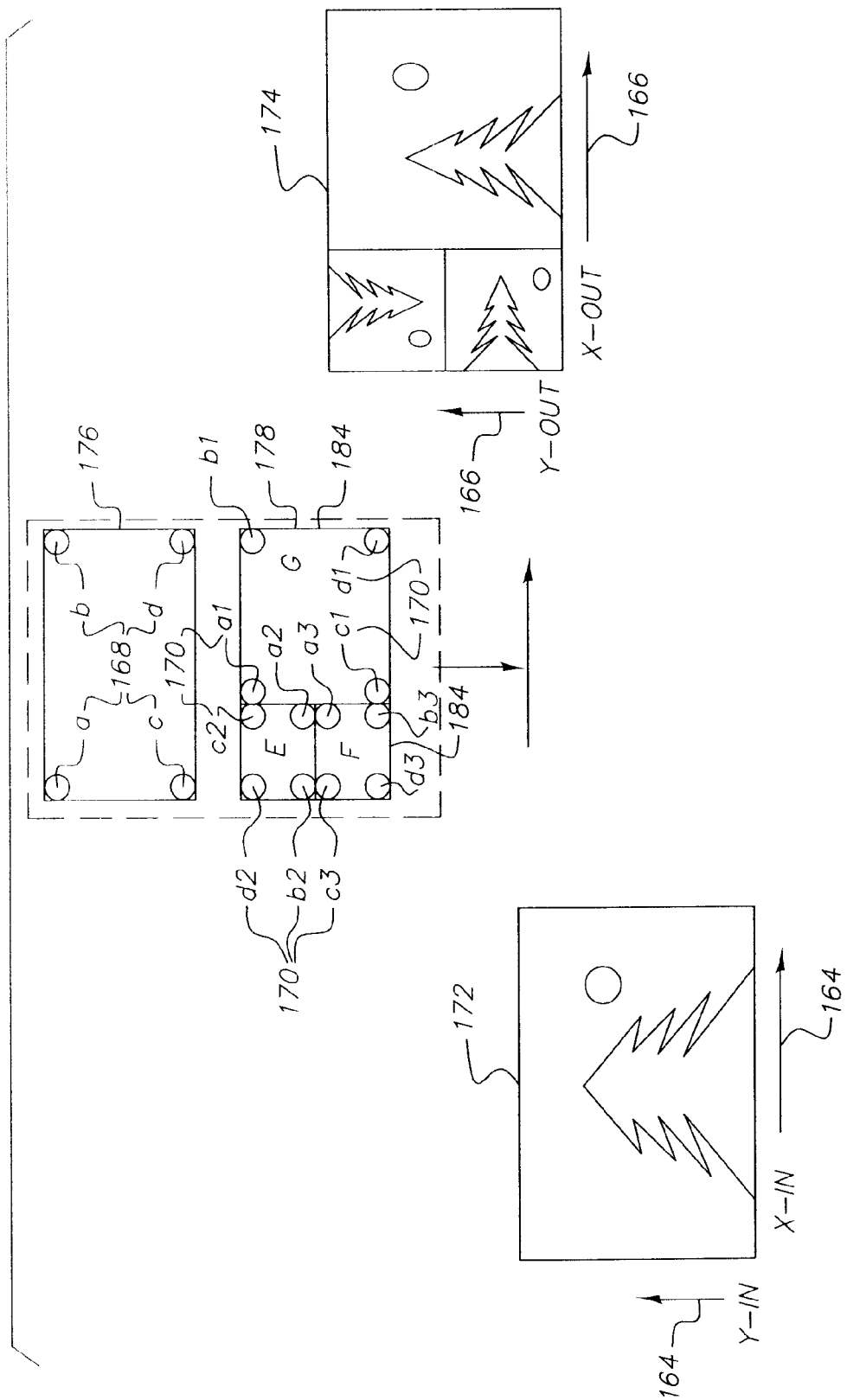
FIG. 8 is a diagrammatical view of an example of a non-uniform image remapping.

Referring now primarily to FIG. 8, the distortion map 150 is used to change the array of pixels of the representational image to the array of pixels of the modified image. In FIG. 8, the first array of pixels is indicated by "x-in" and "y-in" arrows 164. The second array of pixels is indicated by "x-out" and "y-out" arrows 166. The first and second arrays 164,166 of pixels are not necessarily equal in size and can be varied in a manner well-known to those of skill in the art.

The distortion map 150 is a data-set that specifies a plurality of primary input coordinates 168 and a plurality of primary output coordinates 170. In the example distortion map shown in FIG. 8, the data-set is represented as a first grid 176 of input coordinates (individual coordinates are identified by the letters "a", "b", "c", and "d") and a second grid 178 of output coordinates (individual coordinates are identified by the designations "a1", "b1", "c1", "a2", "b2", "c2", "a3", "b3", "c3". A primary input coordinate 168 maps to a location in the representational image 172, on axes x-in and y-in. A primary output coordinate 170 maps to a location in the modified image 174, on axes x-out and y-out. In FIG. 8, the primary coordinates non-uniformly remap the representational image 172 in order to define a modified image 174 which includes three versions of the input image, some of which are rotated and/or squeezed.

Figure 21:
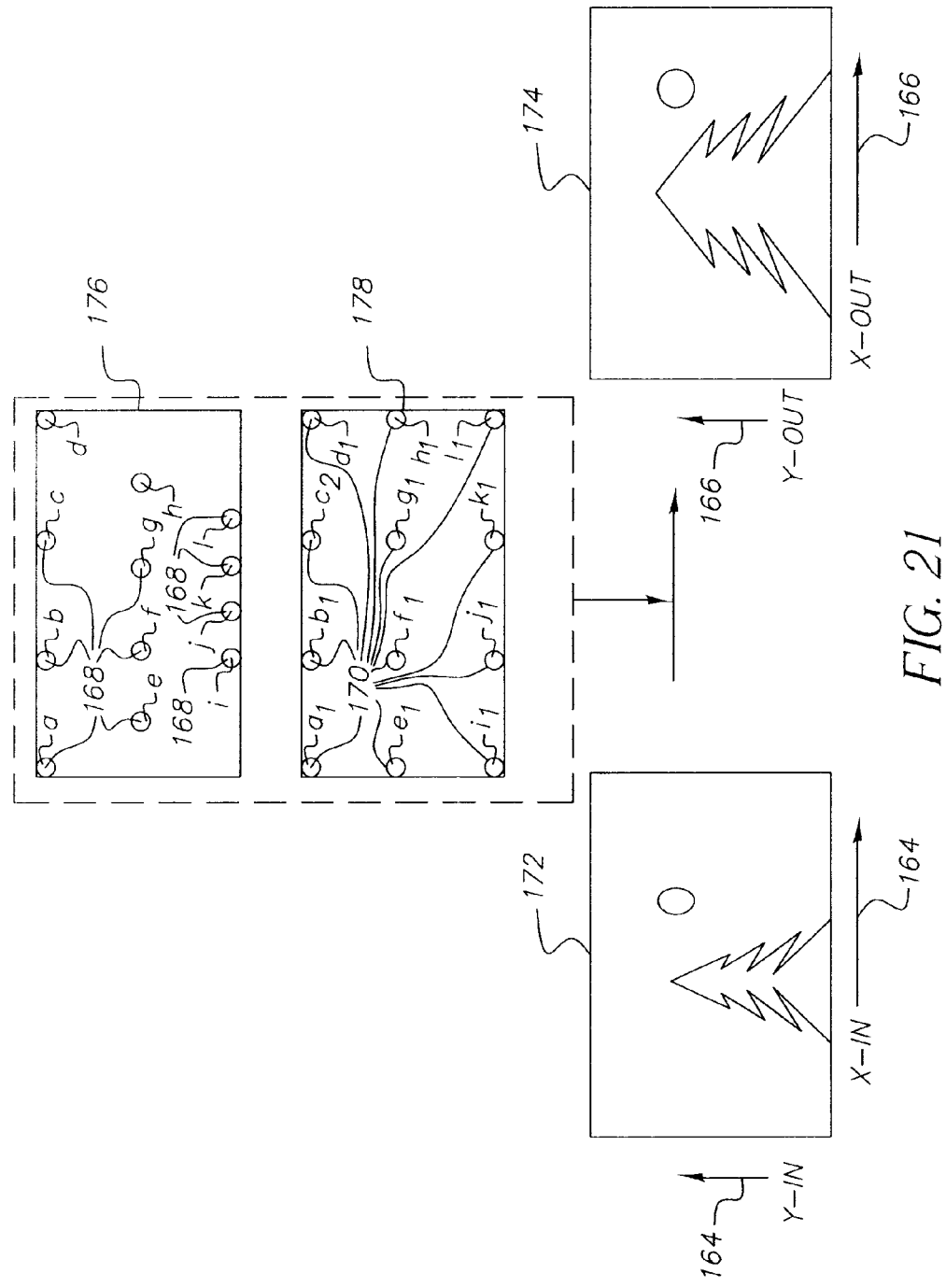
FIG. 21 is a diagrammatical view of another example of a non-uniform image remapping.

In the example shown in FIG. 8, the primary input coordinates are uniformly distributed in first grid 176, and the primary output coordinates are non-uniformly distributed in second grid 178. But this is not required. FIG. 21 shows a second example distortion map, where the primary output coordinates are uniformly distributed, and the primary input coordinates are non-uniformly distributed. In the example of FIG. 21, the primary coordinates non-uniformly remap the representational image 172 in order to define a modified image 174 which stretches the bottom of the picture, while maintaining the normal appearance of the top of the picture. Uniformly distributing the primary output coordinates is preferred, in order to simplify the generation of secondary output coordinates, as will be described later. In this case, the primary input co-ordinates are non-uniformly distributed in a way that provides the desired distortion.

The input and output coordinates are discussed here in terms of a coordinate space having the same dimensions, on a point by point basis, as the pixel arrays 164,166. In practice, the coordinates and coordinate space need not map on a point by point basis on the pixel arrays, but can map in a more complex manner, if desired. For example, each point in the coordinate space can represent multiple pixels or vice versa.

Figure 20:
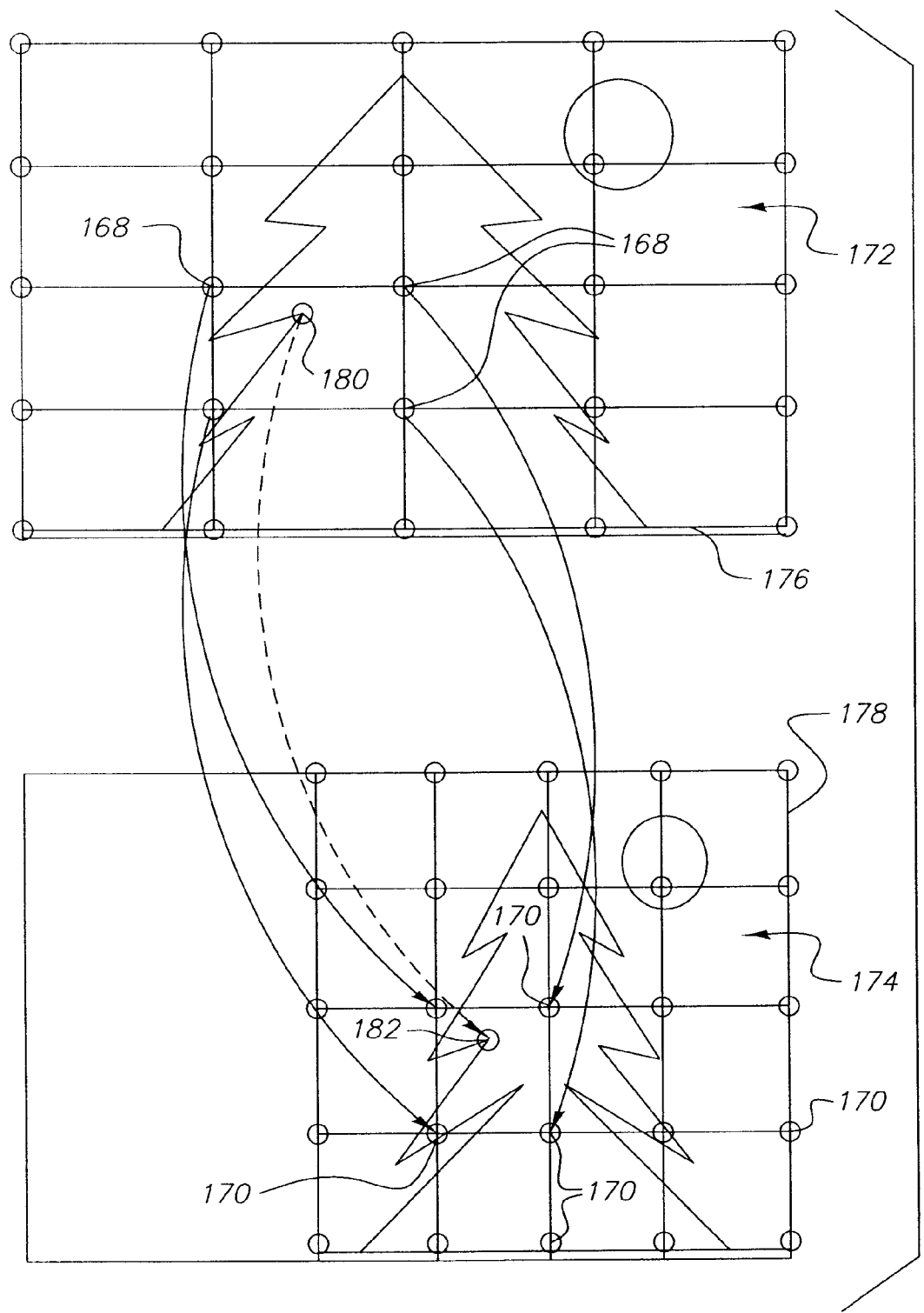
FIG. 20 is a diagrammatical view showing input and output coordinate grids superimposed on the representational image and modified image respectively. (An empty area in the latter would be occupied by part of a replacement template (not shown)

Each primary input coordinate is associated, in the data-set, with one or more primary output coordinates. The associated coordinates are referred to herein as primary input-output coordinate pairs 168,170. Each coordinate pair 168, 170 defines a vector in a coordinate space mappable on the pixel arrays. Each vector leads from a primary input coordinate 168 to a respective primary output coordinate 170. The data-set of distortion map 150, thus, represents a collection of two-dimensional vectors. In FIG. 8, primary input coordinates are mapped to multiple output coordinates in order to provide multiple distorted versions of the representational image 172. For example, three vectors begin at coordinate 168a. These vectors are represented by primary input-output coordinate pairs 168a, 170a1; 168, 170a2; and 168a, 170a3. In FIG. 20, vectors are illustrated as curved solid line arrows from primary input coordinates to respective primary output coordinates.

The data-sets are small. The primary coordinates 168 and 170 do not map all of the pixels of the representation image 172 and the modified image 174. The members of the primary coordinate pairs 168, 170 map to less than 25 percent of the pixels of each of the arrays 164, 166 and, preferably, map to less than 8 percent of the pixels of each array 164, 166. The primary coordinate pairs 168, 170 are thus insufficient in number, by themselves, to fully provide a modification of the representational image that would present a satisfying remapped electronic image.

Referring now to FIG. 20, primary input coordinates 176 and primary output coordinates 178 define respective secondary input coordinates 180 and secondary output coordinates 182 (indicated by circles with crosses in FIG. 20). Secondary output coordinates 182 map the remainder of the output coordinate array 166, except where image content will be replaced by a template 156 (not shown in FIG. 20). Secondary input coordinates 180 indicate which Y-in and X-in coordinate locations 164 in the input image 172 are used to provide the pixel values which are mapped to the secondary output coordinates 182. The vector defined by a secondary input coordinate and corresponding secondary output coordinate is illustrated by a dashed line arrow in FIG. 20. These secondary coordinate vectors 180, 182 are not stored in the CIT 140, but are instead computed from the primary coordinate vectors 176, 178 which are stored in the CIT 140.

Each secondary coordinate pair 180, 182 is defined by a geometric relationship to a group of respective primary coordinates 176, 178. Any geometric relationship can be used. Simpler relationships save computing resources and are therefore preferred. In some preferred embodiments having uniformly spaced primary output coordinates 178, each secondary coordinate pair 180, 182 is computed using the four primary coordinates 176, 178 that define a rectangle which surrounds the secondary coordinate. In this case, the secondary output coordinates 182 and associated primary output coordinates 178 are grouped into rectangular blocks or regions 174 of the coordinate plane. Secondary and primary input coordinates 180, 176 are likewise grouped into regions which may have various geometric shapes, depending on the distortion provided by the CIT 140.

For example, in FIG. 8, the primary and secondary output coordinates 180, 182 are grouped into three blocks 184 (labelled "E", "F", and "G"). The relationship between primary and secondary output coordinates 178, 182 is that the secondary coordinates 182 of the different blocks 184 are the distance-weighted x and y averages of the x and y values of the four primary output coordinates 178 within the respective block 184.

Figure 19A:
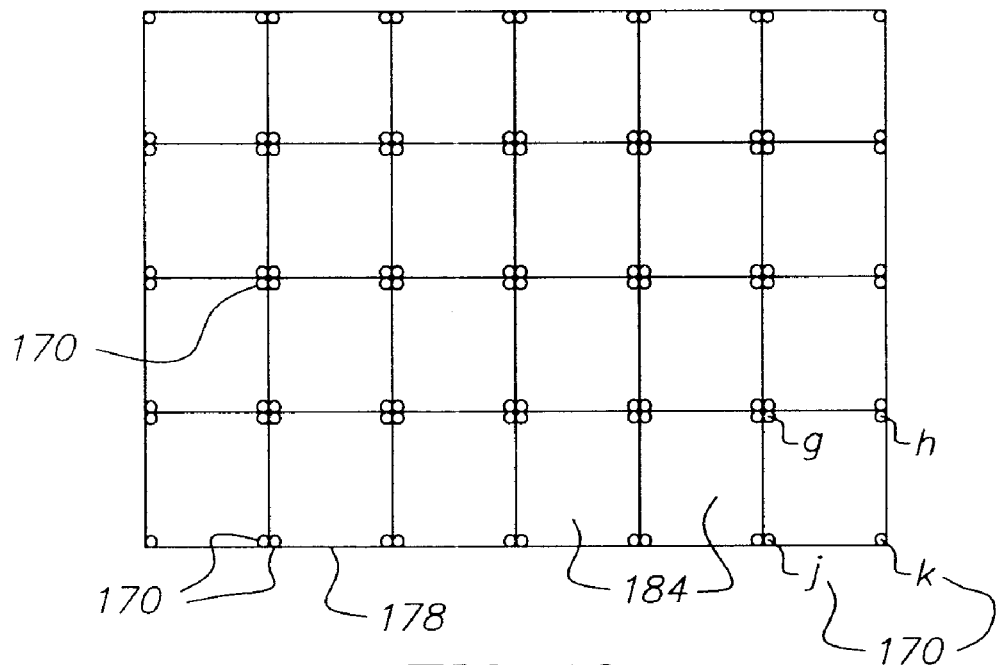
FIG. 19a is a diagrammatical view of an output coordinate grid. Primary output coordinates are illustrated by circles. Blocks are indicated by lines.
Figure 19B:
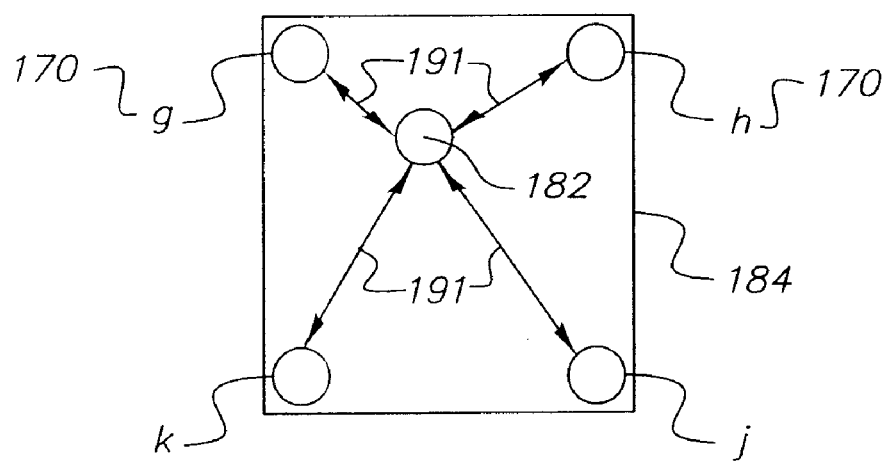
FIG. 19b is an enlargement of one of the blocks of FIG. 19a showing a secondary output coordinate.

In FIG. 8, the primary coordinates are shown spaced apart from each other, so as to define corners of the respective rectangular blocks. Corners and rectangles are convenient; but other relative locations and geometric shapes can likewise be used. Relative locations of primary coordinates and geometric shapes can also be uniform or non-uniform for a particular pixel array. Blocks 184 of uniform shape and size and uniform relative locations can be simpler to process than non-uniform blocks 184 and locations. For example, in a particular embodiment, shown in FIG. 19a, output coordinates 170, 182 are grouped into a grid of blocks 184. Respective primary output coordinates 170 are located at the four corners of each block. Since the primary output coordinates are located at a known spacing, appropriate values can be simply calculated as needed, based upon that spacing. The locations of secondary input co-ordinates 180 to be paired with the secondary output coordinates 182 within a block 184 can be determined by calculating the distance weighted average of the four primary coordinates in the corners of the block (g, h, i, j) as shown in FIG. 19b. By having a large number of secondary output coordinates, relative to the number of primary output coordinates, the size of the distortion map can be reduced. However, this also limits the fidelity of certain types of distortions.

In the embodiment shown in FIG. 19, all blocks 184 are of the same shape and size. This approach is convenient as was mentioned earlier, since the locations of the secondary coordinates are corollaries of the dimensions of each block 184, which in turn, can be generated from the separations of adjoining primary output coordinates. The invention is not limited to a particular placement of the primary coordinates nor to particular sizes and shapes for the blocks. For example, the primary coordinates can be located so as to define each corner of variable-sized blocks. With this approach, blocks can be easily varied in size and shape, as shown earlier in FIG. 8.

The block size of the distortion map 150 is chosen to be fine enough to provide good distortions for interesting effects, yet coarse enough so that only a relatively small memory is required for storage of the primary coordinates. A convenient CIT file size for a digital camera 24 having a 2 megapixel imager 68, removable memory card with 32 megabytes of storage and on-camera displays 16 in the range of 30 mm by 40 mm, is less than 200 kilobytes.

In some embodiments, the CIT 140 provides for first and second distortion maps 150 differing only in block 184 size for the camera and the photofinishing unit. The lower resolution map is utilized in generating an image for the camera display 16. The higher resolution map is utilized in generating an image for output. The same effect can also be provided by changing the block 184 size of a single map as needed. For example, a map can be chosen in which each primary output coordinate in an output image can be used for a single pixel of the camera display 16. This approach minimizes computations required to generate the distortion map 150 for the display 16. Similarly, in FIG. 19, if blocks define a 16×16 grid, then primary coordinates 180 define a corresponding 2×2 grid.

Competing constraints apply to CIT's 140. To create a high quality output image for certain types of effects, a substantial amount of image processing is needed. Camera 24 computations need to be performed at high speed. Computing and memory resources available in a digital camera 24 or other imaging device are a function of cost. If buffer memory is limited, then the image processing firmware which controls digital processing must be designed to use as little memory as possible for intermediate calculations. This is achieved by tiling the pixels in the image in small blocks 184 and processing the image one tile at a time. A suitable block 184 size that balances these constraints is 16×16 pixels. Other block 184 sizes may be used, for example 32×32 pixel blocks 184.

The logical rules for generating secondary input and output coordinates from respective primary input and output coordinates can be kept invariant or can vary in different CIT's 140. In the former case, it is more convenient to provide the rules in the control system 108 of the camera 24. In the latter case, it is more convenient to provide the rules in each CIT 140. The two approaches can be combined, for example, with a default of rules in the control system 108 of the camera 24, subject to variation with particular CIT's 140. The specific algorithms used to generate secondary coordinates can be mathematically simple, as in the examples just discussed, or can be more complex. More complex rules increase processing requirements. The same approach applies to other modifications provided by a CIT 140. It is simple to attach a particular modification to all secondary coordinates generated from a particular primary coordinate, but more complex approaches can be followed.

Figure 16:
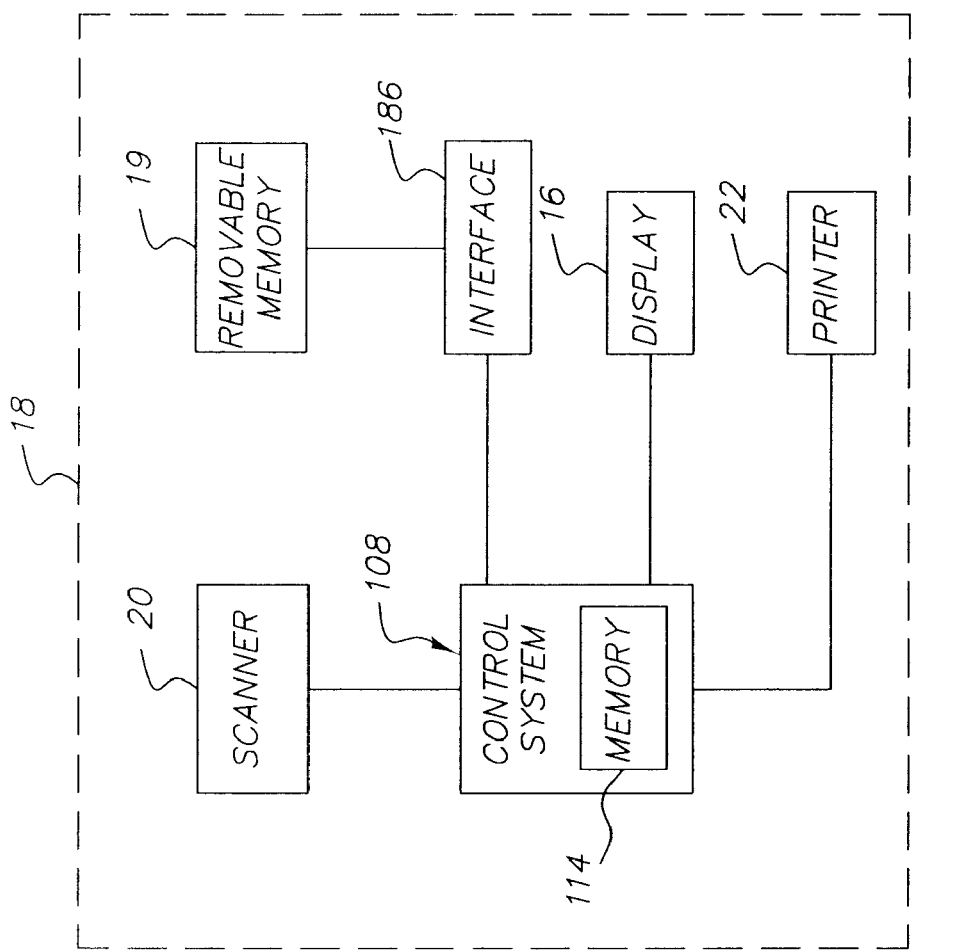
FIG. 16 is a diagram of an embodiment of a scanner-kiosk.

A scanner-kiosk 18 is illustrated in FIG. 16. A scanner 20, which captures images, is connected to a control system 108 that provides digital processing. As in the camera 24, an interface 186 connected to the control system 108 receives removable memory 19. A display 16 and printer 22 are connected to the control system 108. Components operate in the manner described above in relation to cameras 24. Image files can be provided on the removable memory along with respective CIT's 140 or with identifiers of predefined CIT's 140 stored on the kiosk 18 in on-board memory or available via a connection to networked memory (not shown). Images captured using the scanner 20 can be modified using CIT's 140 in on-board memory, or downloaded from a network or provided in the removable memory. Resulting modified images can be displayed, printed, and stored in the removable memory. The small size of the CIT's 140 due to the use of the above-discussed vectors makes transfer and handling of CIT's 140 in cameras 24 and other equipment quick and easy.

Figure 9:
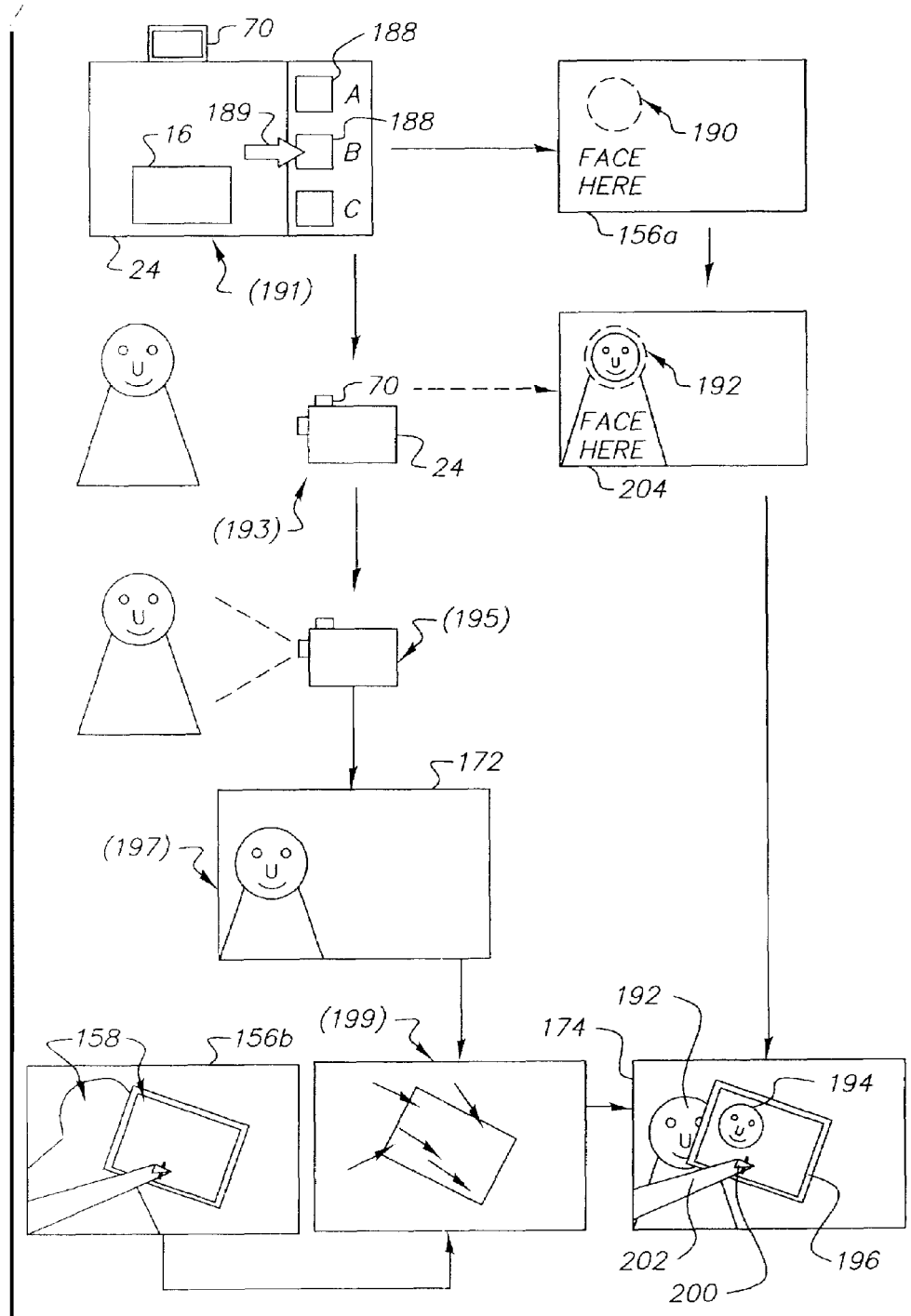
FIG. 9 is a simplified diagrammatical view of another embodiment of the method.
Figure 10:
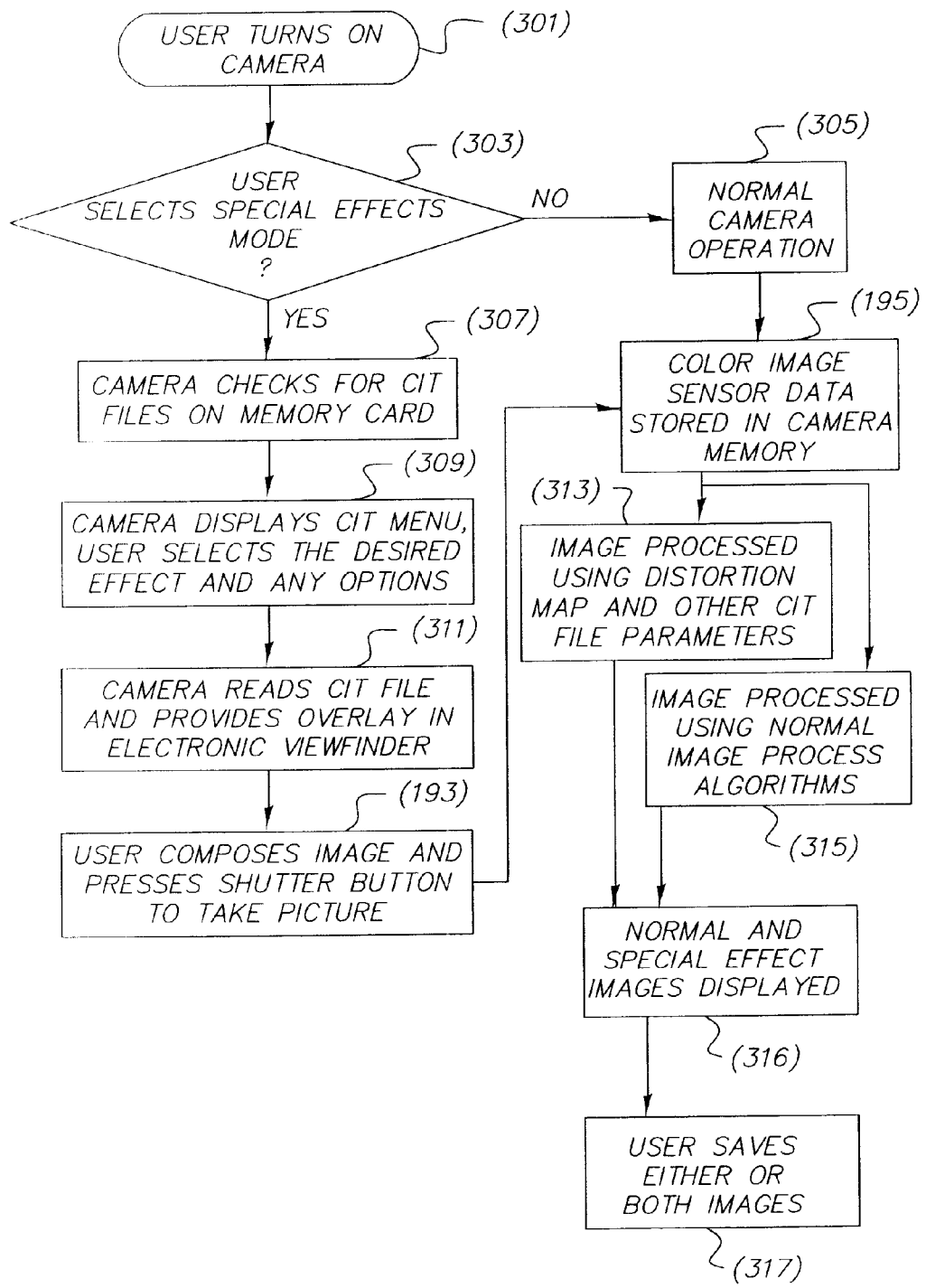
FIG. 10 is a flow chart illustrating a first mode of operation called the camera of FIG. 7.

Use of a CIT 140 having a capture template 156a and a replacement template 156b is illustrated in FIGS. 9 and 10. In FIG. 9, the steps of the procedure are indicated on the left and the images shown on the display 16 are indicated on the right. The user first activates (301) the camera 24 via a power switch (not separately illustrated). When activated, the camera 24 gives the user the option (303) of selecting a "normal" mode (305) or a "special effects" mode. After the control system has determined (307) what CIT files 140 are available, both in permanent memory and stored on an installed memory card 19; the control system provides (309) a user interface display of the available options. (This is indicated in FIG. 9 by the letters "A", "B", "C".) The user then selects (indicated in FIG. 9 by arrow 189 in step (191)) a particular CIT 140. Specific user controls for these purposes can be varied. "Soft" buttons that are assigned as needed along with accompanying designations are convenient. (For example, the camera 24 of FIG. 4 is activated by flipping up the flash unit 40 and the modes are displayed on the information display 109 along with designations of the button 188 to press for each mode and then, in a later step, for each CIT 140.) Alternatively, a four-way controller and graphical interface can be used to select an icon or text message corresponding to a desired effect.

In FIG. 9, after the photographer selects a CIT 140 having a capture template 156 from a group of CIT's 140 on the memory card 19, the camera provides (311) the capture template on the display and the user composes (193) the image in preview mode (live video or stop motion), using the camera display 16 and a capture template 156 generated by the controller 88 from data provided by the CIT 140. The capture template 156 can also include instructions 190 to help the user compose the image. The instructions 190 can be provided on the display 16 as text, icons, or graphics or can be provided using other camera features. The instructions can be displayed on the display either just after the CIT 140 file has been selected, or as the image is being composed. In FIG. 9, the template 156 includes instructions 190 in the form of the words "face here" and a reticle in the form of a circle on the preview image. A preview image 204 is shown that includes the superimposed capture template.

In composing the image using a capture template or modified preview image, the user also composes using other camera functions, such as the zoom lens buttons 126. When satisfied with the image composition, the user presses the shutter release 128 to capture and store (195) a desired electronic image.

In the embodiment shown in FIG. 9, the control system processes (197) the electronic image to provide a representational image and then applies (199) the CIT to the representational image to provide the modified image. The representational image is not shown to the user. The application of the CIT is shown in FIG. 9 as an outline of the template and some arrows representing relocation vectors)

In the embodiment shown in FIG. 10, one copy of the stored electronic image is processed (313) using the CIT and a second copy is processed (315) and the representational image and modified image are both displayed (316). The user selects and "saves" (317) one or both. Saving of modified images is discussed elsewhere herein.

In a particular embodiment, the preview images are produced by the camera controller 88 generating signals that continuously expose the sensor, and clocking out a subset of the image pixels to provide a reduced resolution analog image-bearing signal. This analog signal is digitized and processed and stored in buffer memory. An example of a procedure for this is disclosed in U.S. Pat. No. 5,828,406, entitled "Electronic camera having a processor for image pixel signals into color display pixels". The preview image is also modified, with some CIT's, to overlay instructions on the preview images, such as a reticle of a capture template.

Figure 11:
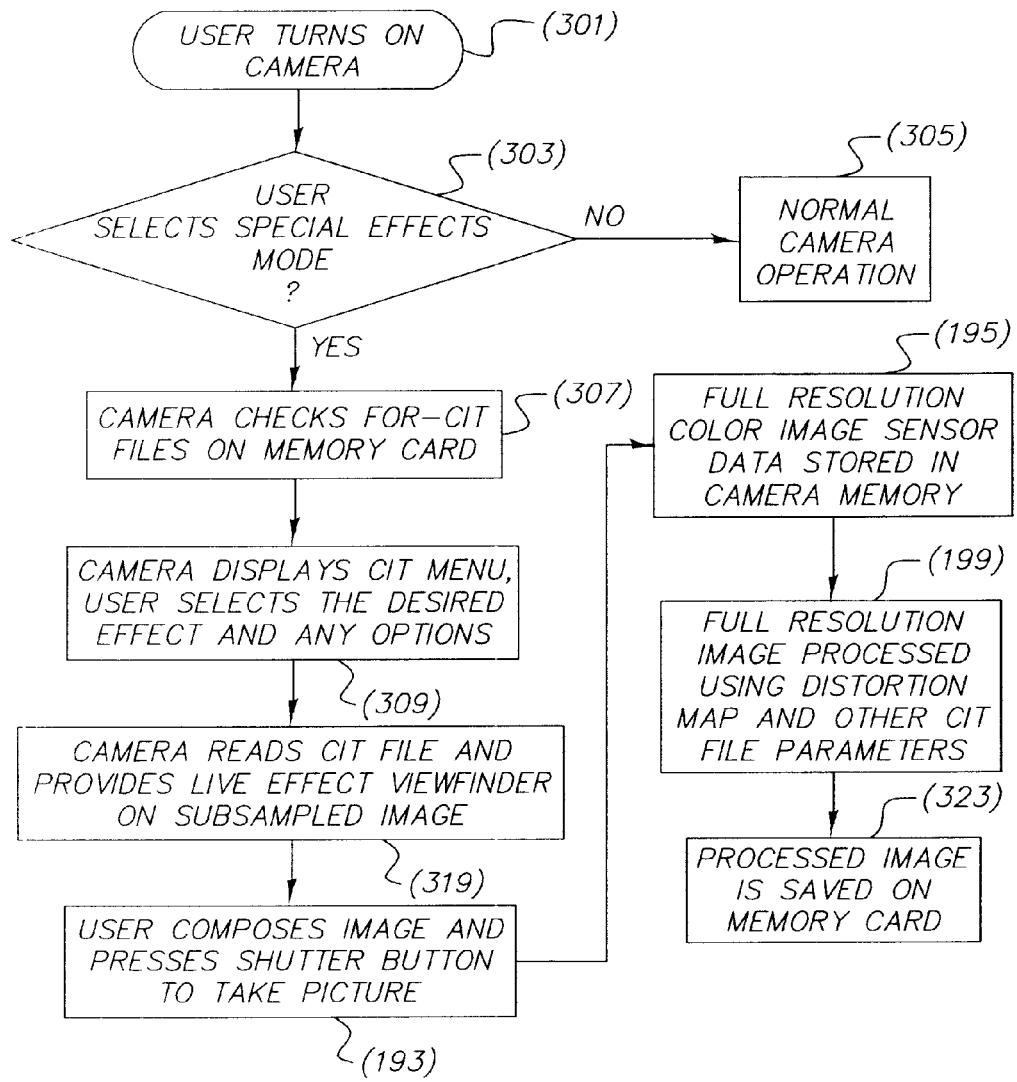
FIG. 11 is a flow chart illustrating a second mode of operation of the camera of FIG. 7.

Referring now to FIG. 11, rather than providing a capture template, the camera 24 can, alternatively, show the effect of a CIT 140 in preview images, instead of simply designating the area of the effect. In this case the control system 108 reads the CIT file and processes the images provided in preview mode to provide (319) a continuing series of low resolution modified images. This requires more processing, since each image provided to the display must be processed and it may be necessary to reduce the display update frame rate, compared to the rate that can be supported in the "normal" mode. The modification provided for the preview images can be modified, relative to after capture modification, to simplify effects that would require a large amount of processing and to eliminate more subtle effects that would not be quickly noticeable on the camera display 16. After a picture is taken (193) an image is stored (195) at full resolution and the CIT is applied (199). The resulting modified image is displayed and can be "saved" (323).

Figure 13:
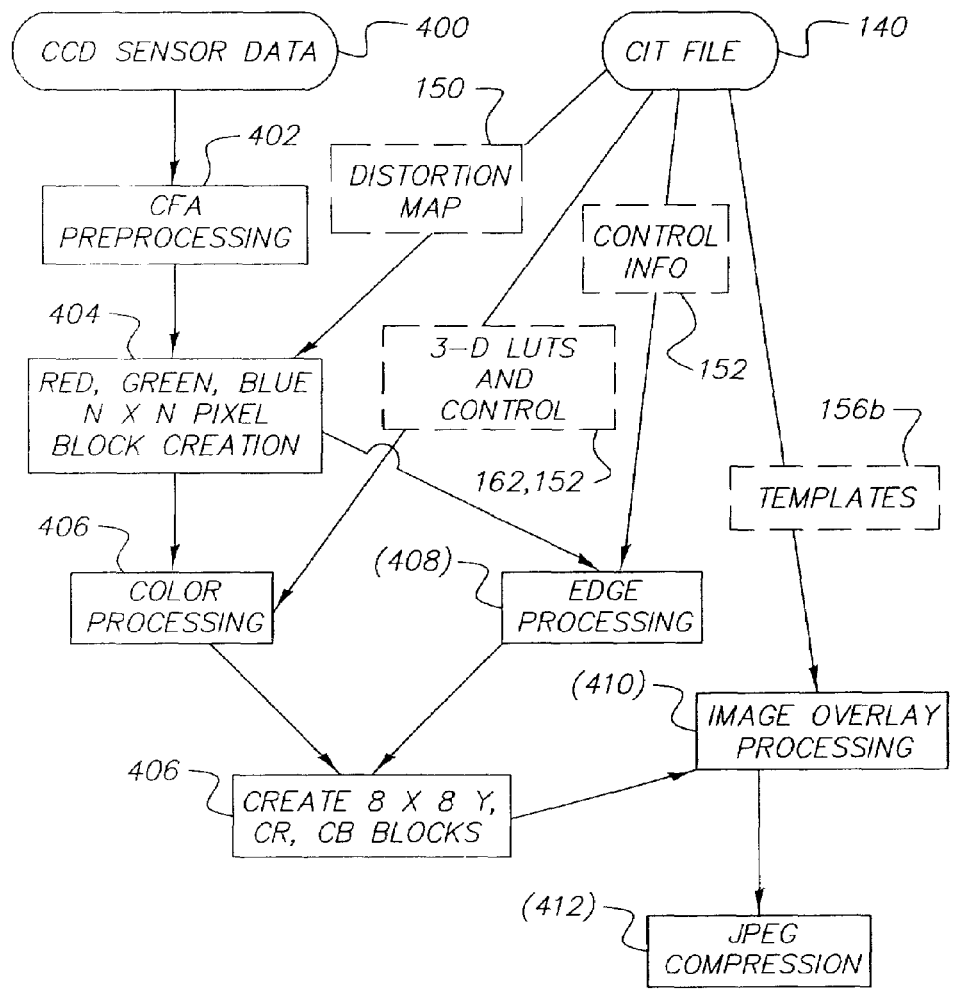
FIG. 13 is a diagram illustrating the relationship between different processing steps in the camera of FIG. 7.

The specific processing provided in addition to a relocation modification can vary. The following describes an embodiment illustrated by FIG. 13 and FIG. 3. The imager 68 is a CCD image sensor that captures the archival image as full resolution color filter array (CFA) image data 400. The data is then sent to the A/D converter 110 and the resulting digital image is stored in buffer memory 114a. The processor 112 takes the Color Filter Array (CFA) image data and creates a "finished" JPEG compressed image, for example using the Exif/JPEG version 2.1 image format standard. Since the resulting JPEG file is a very common image file format, it may be used by most computer software applications. The image processing is conveniently organized into modules. The processing operations performed by these modules are described below.

In a first module 402, CFA preprocessing is performed on the Bayer pattern CFA data stored in the memory. Both the input and output are Bayer pattern CFA data. The processing includes defect concealment and noise filtering.

Next, the block creation module 404 performs all of the image processing necessary to create a 16×16 area+ring pixels (in the resolution of the output image) of RGB pixels in memory. The image processing in this module includes reading an area of the CFA image, performing white balance, CFA reconstruction (as described in U.S. Pat. No. 5,506,619, entitled "Adaptive color plan interpolation in single sensor color electronic camera") and resizing to the output resolution, (as described in U.S. application Ser. No. 09/048,605, filed 26 Mar. 1998, entitled "Digital photography system 10 using direct input to output pixel mapping and resizing"). The resizing operation also supports digital zoom.

In the next module 406, the RGB block created in the first step is in the device-dependent color space of the image sensor. To provide a standard Exif/JPEG output image file, the sensor RGB color pixel values following CFA reconstruction must be converted to sRGB color space values using, for example, a 3×3 linear space color matrix. Such a linear matrix is described in U.S. Pat. No. 5,189,511, entitled "Method and apparatus for improving the color rendition of hardcopy images from electronic camera 24". A block 184 is set equal to one JPEG image compression MCUs (Minimum Coded Units) for 4:2:0 sampled Y,Cb,Cr images. In this block 184, the color space of the RGB pixels is converted to the desired output space. In addition, the pixels are converted to YCbCr for optimal JPEG compression. This module also performs the 4:2:0 chrominance subsampling so that each JPEG 16×16 pixel MCU includes four luminance (Y) 8×8 pixel compressed blocks 184, one Cb block 184, and one Cr block 184.

Due to the effects of the camera lens and anti-aliasing filter, as well as the CFA reconstruction algorithm, the image data may be a little blurry. To correct for this, another module 408 provides edge sharpening. An example of edge sharpening is described in U.S. Pat. No. 5,189,511. This module reads the RGB block 184 created in the first step and modifies the 8×8 output block 184 created in the second section. At this point, the output block 184 is complete and ready for optional overlay processing followed by JPEG compression.

In the next module, various types of overlay information from the replacement template is written "on top" of the captured image, thus replacing the captured pixel values with colored text, graphics surround, or a background picture. Examples include a date/time stamp or a border file that resembles the border of a "baseball card". This next module modifies the output block to add these overlays. To provide the "fun looking" creative image transmogrification processing, additional processing operations are added to one or more of the above processing blocks. This additional processing is indicated in the CIT 140 file for the selected CIT 140 effect.

For the effect shown in FIG. 9, the face 192 of the subject is duplicated, and the second copy 194 is tilted and shrunk to appear as part of a framed drawing in the image. A replacement template 156 is superimposed over the image, partially obscuring the body 26 and face 192 of the subject. The replacement template 156 surrounds the second copy 194 of the face with a picture frame 196 and a hand with a pencil 200 that appears to be drawing the second copy. An arm 202 added by the replacement template 156 reaches back to the body of the subject.

Other modifications of this CIT 140 can also be provided. The "drawing" can be made to appear as a monochrome image or a sepia colored image, or may subject to alternative processing relative to an unmodified image. For example, the second copy could be given a cartoon effect, in which the colors drawn in the "paper area" are saturated and the edges are outlined to create an image that looks like a cartoon. Similarly, the second copy could be given an outline effect, in which the outline portion of the cartoon algorithm is enabled, but the background image is set to white. The result is an image that looks like a pencil outline of the original image.

In a final module 412, the processor creates a "finished" JPEG compressed image, for example using the Exif/JPEG version 2.1 image format standard. Since the resulting .JPG file is a very common image file format, it may be used by most computer software applications.

Some CIT's 140 can provide one or more variable parameters. For example, a CIT 140 file can include a parameter for changing the sharpness of an image by changing a sharpening kernel to blur portions of the image.

The Block Creation module uses the distortion map 150 within the CIT 140 file to provide replication or distortion of the original image when producing the output image. For example, the image can be stretched or compressed two-dimensionally to create a "fatter" or "thinner" portion of the image, such as the face or eyes. The distortion data stored in the CIT file can include a list of 8 numbers for each 32×32 block 184 in the output image. Other block 184 sizes, such as 16×16 or even "single pixel (1×1) blocks 184, can be used, but the size of the CIT 140 file becomes significantly larger as the block 184 size is reduced. The 8 numbers represent the XY position in the CFA image to sample for each of the four corner pixels in the 32×32 pixel block 184. The sampling positions for each of the other pixels in the block 184 are interpolated from the corner pixels. This is done to provide the sampling position for each pixel in the 16×16 processing block 184.

If information in the CIT 140 file indicates that an entire block 184 will be occluded (e.g. covered behind a template 156 image), that image block 184 is not processed, in order to reduce the processing time.

Alternately, image distortion can be implemented in the CFA preprocessing module. This is most efficient for effects that require an area of the image that would be too large for normal block-based processing, such as adding directional blur to an image. It is also appropriate for effects that are position dependent because it is typically faster to loop through the image (or the relevant part of the image) one time to apply the effect than to calculate the position for every block. The processing must account for the fact that the CFA image will later be interpolated to provide a full RGB image.

In cartoon processing, the color processing module uses a three dimensional look up table ("3D LUT") to create an output image. The CIT file may contain one or more alternate 3D LUTs that are used by particular blocks in the image. For example, it may contain a 3D LUT that provides very saturated colors to create a "cartoon" type appearance when used in conjunction with an outline algorithm implemented in the edge processing module which creates dark lines along the edges in the image. For the example shown in FIG. 9, this "cartoon" type color processing is only performed in the "drawing on the paper" section of the image. The other portions of the image are processed in the normal manner.

Figure 12:
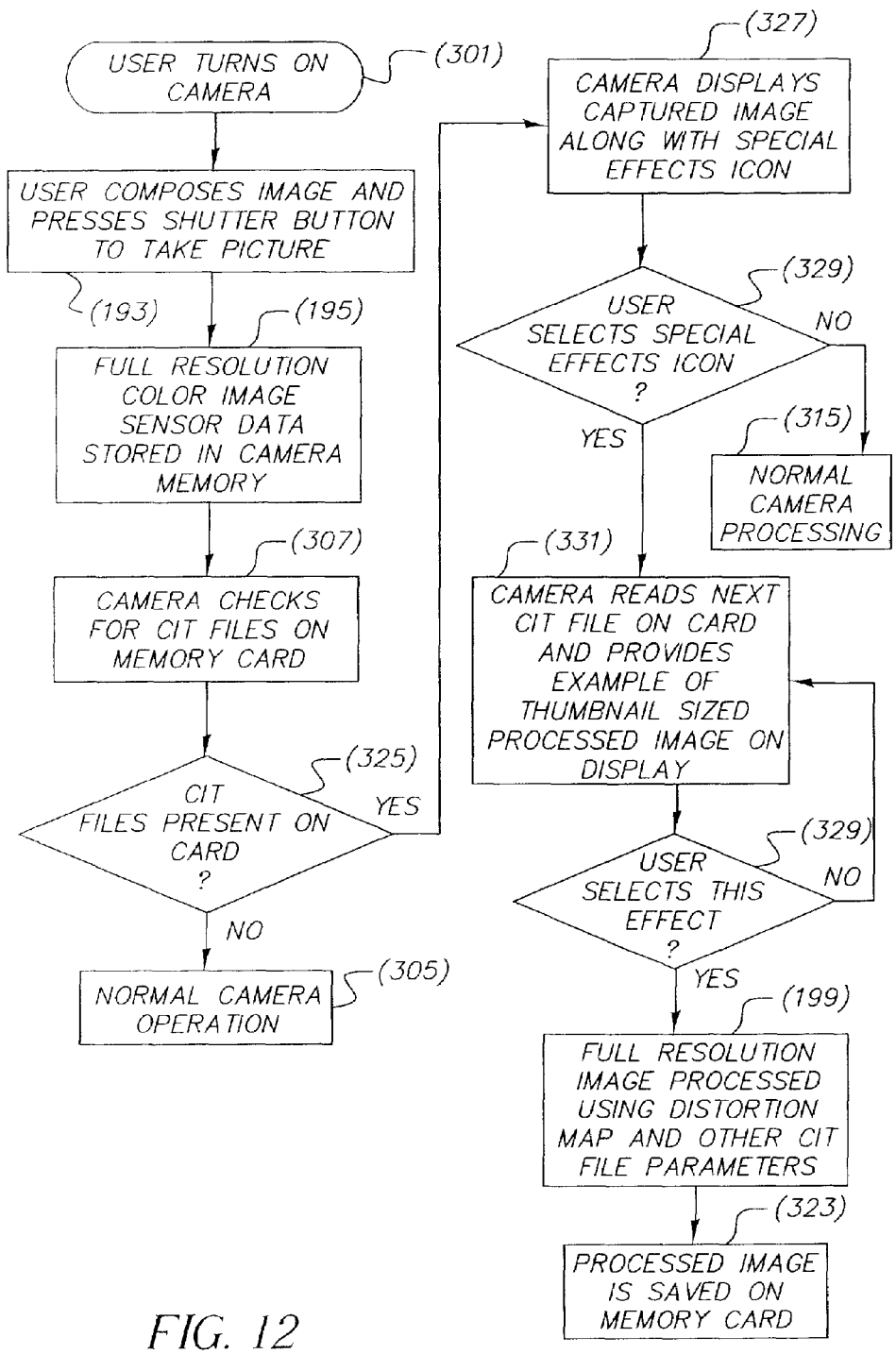
FIG. 12 is a flow chart illustrating a third mode of operation of the camera of FIG. 7.

Referring now to FIG. 12, the camera 24 can be used to provide special effects after capture of an archival image. In this case, the camera checks (325) for CIT files 140 and then displays (327) the captured image along with control features, such as "soft" buttons that give the photographer the opportunity to select a particular CIT 140. Effects can be indicated by indicia or the like, but it is preferred that a selected modification is performed on the captured image and then displayed for review. In that case, the camera checks (329) for selection by the user of a special effects mode and then displays (331) the effects of particular CIT's one after another. The camera checks (329) for selection of a CIT and when one is selected presents a full resolution modified image. With a small display 16 on a camera 24, some effects may not be fully apparent, as earlier discussed. This approach is particularly suitable for effects that are subject to user modification, since results are immediately apparent, but can be changed. This approach can also be modified to allow capture of multiple images, with an earlier image acting as a template 156 for a later image.

The invention has been described in detail with particular reference to certain preferred embodiments thereof, but it will be understood that variations and modifications can be effected within the spirit and scope of the invention.

PARTS LIST 10 system
11 captures
12 capture device
13 digitized and calibrated
14 photofinishing unit
15 stored
16 display
17 displayed
18 kiosk
19 removable media
20 scanner
21 captured
22 printer
23 copied
24 camera
25 accepts
26 body
27 modified
28 archival image capture unit
29 accepts
30 evaluation image capture unit
31 accepts
32 cover
33 writes
34 cover
35 discarded
36 chassis
37 digitally processed
38 film door
39 calibrated
40 flash unit
41 output
42 film holder
43 developed
44 film unit
45 digitized
46 film chamber
48 film chamber
50 exposure frame
52 canister
54 filmstrip
56 spool
58 film roll
60 frame of film
62 film transport
64 electric motor
66 data writer
68 imager
70 viewfinder
72 first path
74 second path
76 taking lens unit
78 combined lens unit
80 partially transmissive mirror
82 fully reflective mirror
84 eyepiece
86 zoom driver
88 controller
90 autofocusing system
92 sensor
94 ranger
96 focus driver
98 film shutter
100 imager shutter
102 Diaphragms/aperture plates
104 imager driver
106 image display driver
108 control system
109 information display
110 A/D converter
112 processor
114 memory
116 data bus
118 aperture drivers
120 shutter drivers
121 ambient sensor driver
122 flash circuit
123 ambient sensor
124 information display driver
126 "zoom in" and "zoom out" buttons
128 shutter release
132 first switch
136 second switch
138 film unit detector
140 CIT
142 identifier
146 reader
148 look-up table
150 distortion map
152 control information
154 information
156 template
158 opening
162 look-up table
164 arrows
166 arrows
168 primary coordinates
170 primary coordinates
172 representational image
174 modified image
176 first grid
178 second grid
180 arrows
182 arrows
184 block
186 interface
188 button
189 arrow
190 instructions
191 selects
192 face
193 composes
194 second copy
195 capture
196 picture frame
197 processes
199 applies
200 pencil
202 arm
301 activates
303 option
305 "normal" mode
307 determined
309 provides 311 provides
313 processed
315 processed
316 displayed
317 "saves"
319 provide
323 "saved"
400 color filter array (CFA) image data
402 modules
404 modules
406 modules
408 modules
412 modules

The invention claimed is:

1. A digital memory containing a plurality of different modification files for modifying a captured electronic image, each of the modification files comprising:
 (a) a template including an opening; and
 (b) processing control information which instructs a processor to form an output image by:
  (i) generating a background image showing a portion of the captured electronic image,
  (ii) applying the template over less than all of the background image;
  (iii) generating a modified version of a section of the portion of the captured electronic image; and,
  (iv) overlaying the opening with the modified version of the electronic image.

2. The digital memory of claim 1, wherein the template includes a drawing instrument and wherein the modified version of the electronic image appears to have been hand drawn using the drawing instrument.

3. The digital memory of claim 2, wherein the modified version of the electronic image has a cartoon effect.

4. The digital memory of claim 2, wherein the modified version of the electronic image appears to have been drawn with a pencil.

5. The digital memory of claim 2, wherein the modified version of the electronic image shows an outline image.

6. The digital memory of claim 1, wherein each of the modification files further comprises data representing a distortion map.

7. The digital memory of claim 6, wherein the data representing the distortion map defines a plurality of primary coordinate pairs, each said primary coordinate pair having an input coordinate associated with the captured electronic image and an output coordinate associated with the output image.

8. The digital memory of claim 7, wherein the output coordinates of the primary coordinate pairs are arranged in a two-dimensional grid superimposed over at least a portion of the output image.

9. The digital memory of claim 8, wherein each said primary coordinate pair has an input coordinate associated with the captured electronic image and a secondary coordinate associated with the output image.

10. The digital memory of claim 1, wherein each of the modification files further comprises user interface information.

11. The digital memory of claim 10, wherein the user interface information provides instructions to assist a user in capturing the captured digital image.

12. A computer-readable storage medium having a modification file for modifying a captured electronic image, comprising:
 (a) a template including an opening; and
 (b) processing control information which instructs a processor to form an output image by
  (i) generating a background image showing a portion of the captured electronic image,
  (ii) applying the template over less than all of the background image;
  (iii) generating a modified version of a section of the portion of the captured electronic image; and,
  (iv) overlaying the opening with the modified version of the electronic image.

13. The computer-readable storage medium of claim 12, wherein the template includes a drawing instrument and wherein the modified version of the electronic image appears to have been hand drawn using the drawing instrument.

14. The computer-readable storage medium of claim 13, wherein the modified version of the electronic image has a cartoon-like appearance.

15. The computer-readable storage medium of claim 13, wherein the modified version of the electronic image appears to have been drawn with a pencil.

16. The computer-readable storage medium of claim 13, wherein the modified version of the electronic image shows an outline image.

17. The computer-readable storage medium of claim 12, wherein each of the modification files further comprises data representing the distortion map.

18. A method for modifying a captured electronic image, comprising:
 (a) providing a modification file, the modification file including
  (i) a template including an opening; and
  (ii) processing control information;
 (b) communicating the modification file over a network to a processor, and;
 (c) using the processor and the modification file to form an output image by:
  (i) generating a background image showing a portion of the captured electronic image,
  (ii) applying the template over less than all of the background image;
  (iii) generating a modified version of a section of the portion of the captured electronic image; and,
  (iv) overlaying the opening with the modified version of the electronic image.

19. The method of claim 18, further comprising printing the output image.

20. The method of claim 19, wherein the captured electronic image is captured using a scanner.

* * * * *